(12) United States Patent
Shurtleff et al.

(10) Patent No.: US 7,651,542 B2
(45) Date of Patent: *Jan. 26, 2010

(54) SYSTEM FOR GENERATING HYDROGEN FROM A CHEMICAL HYDRIDE

(75) Inventors: Kevin Shurtleff, Orem, UT (US); Eric Ladd, West Jordan, UT (US); John Patton, West Jordan, UT (US); Chris Brydon, Salt Lake City, UT (US); Ken Pearson, Shingle Springs, CA (US)

(73) Assignee: Thulite, Inc, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/829,019

(22) Filed: Jul. 26, 2007

(65) Prior Publication Data

US 2008/0025880 A1 Jan. 31, 2008

Related U.S. Application Data

(60) Provisional application No. 60/820,574, filed on Jul. 27, 2006.

(51) Int. Cl.
*C01B 3/26* (2006.01)
*C10J 3/20* (2006.01)

(52) U.S. Cl. .............. 48/61; 48/120; 48/174; 422/211; 422/234; 422/239

(58) Field of Classification Search .......... 48/61, 48/120, 174; 422/239, 211, 234, 236
See application file for complete search history.

(56) References Cited

U.S. PATENT DOCUMENTS

| | | | |
|---|---|---|---|
| 2,542,746 A | 2/1951 | Banus et al. | 423/288 |
| 3,133,837 A | 5/1964 | Eidensohn | 429/19 |
| 3,313,598 A | 4/1967 | Gluckstein | 23/211 |
| 3,449,078 A | 6/1969 | Quik et al. | 23/212 |
| 3,511,710 A | 5/1970 | Jung et al. | 136/86 |
| 3,649,360 A | 3/1972 | Bloomfield et al. | 136/86 |
| 3,734,863 A | 5/1973 | Beckert et al. | 252/188 |
| 3,940,474 A | 2/1976 | Huskins et al. | 423/648 |
| 3,977,990 A | 8/1976 | Beckert et al. | 252/188.3 |
| 4,000,003 A | 12/1976 | Baker et al. | 429/7 |
| 4,081,345 A | 3/1978 | Tolg et al. | |
| 4,155,712 A * | 5/1979 | Taschek | 422/239 |
| 4,261,955 A | 4/1981 | Bailey, Jr. et al. | 422/239 |
| 4,261,956 A * | 4/1981 | Adlhart | 422/239 |

(Continued)

OTHER PUBLICATIONS

"Fuel Chemistry News" Newsletter of the ACS Division of Fuel Chemistry, vol. 82, No. 2, Fall 2003.

(Continued)

*Primary Examiner*—N. Bhat
(74) *Attorney, Agent, or Firm*—Kunzler & McKenzie

(57) ABSTRACT

An apparatus is disclosed to generate hydrogen. A liquid permeable material with one or more cavities contains a solid anhydrous chemical hydride and an anhydrous activating agent. A housing that is heat and pressure resistant houses the liquid permeable material, and a liquid. One or more liquid sources inject the liquid into the housing such that the liquid contacts at least a portion of the liquid permeable material. A gas outlet port releases hydrogen gas produced by a reaction comprising the solid anhydrous chemical hydride, the anhydrous activating agent, and the liquid. A hydrogen output regulator controls the amount of hydrogen gas that the gas outlet port releases.

19 Claims, 5 Drawing Sheets

U.S. PATENT DOCUMENTS

| | | | |
|---|---|---|---|
| 4,433,633 A | 2/1984 | Caudy et al. ................ 114/54 |
| 4,436,793 A | 3/1984 | Adlhart ....................... 429/17 |
| 4,463,063 A | 7/1984 | Adlhart ....................... 429/19 |
| 4,463,066 A | 7/1984 | Adlhart et al. ............... 429/34 |
| 4,463,068 A | 7/1984 | Cohn et al. .................. 429/34 |
| 4,486,276 A | 12/1984 | Cohn et al. .................. 204/98 |
| 4,513,065 A | 4/1985 | Adlhart ....................... 429/19 |
| 4,543,246 A | 9/1985 | Houser ....................... 423/648 |
| 4,628,010 A | 12/1986 | Iwanciow .................... 429/19 |
| 4,740,504 A | 4/1988 | Hall et al. .................... 514/64 |
| 4,782,096 A | 11/1988 | Banquy ....................... 518/704 |
| 4,940,667 A | 7/1990 | Goldstein et al. |
| 4,962,462 A | 10/1990 | Fekete ........................ 364/492 |
| 4,968,393 A | 11/1990 | Mazur ......................... 204/59 |
| 4,973,530 A | 11/1990 | Vanderborgh ............... 429/13 |
| 4,977,094 A | 12/1990 | Goldstein et al. |
| 4,978,451 A | 12/1990 | Taylor ........................ 210/500 |
| 4,988,583 A | 1/1991 | Watkins et al. ............... 429/30 |
| 5,047,301 A | 9/1991 | Adlhart et al. ............... 429/101 |
| 5,108,849 A | 4/1992 | Watkins et al. ............... 429/30 |
| 5,186,903 A | 2/1993 | Cornwell |
| 5,200,278 A | 4/1993 | Watkins et al. ............... 429/24 |
| 5,205,841 A | 4/1993 | Vaiman ....................... 55/16 |
| 5,221,520 A | 6/1993 | Cornwell |
| 5,229,222 A | 7/1993 | Tsutsumi et al. ............. 429/19 |
| 5,264,299 A | 11/1993 | Krasij et al. .................. 429/30 |
| 5,292,600 A | 3/1994 | Kaufman ..................... 429/39 |
| 5,294,410 A | 3/1994 | White |
| 5,314,762 A | 5/1994 | Hamada et al. .............. 429/37 |
| 5,366,820 A | 11/1994 | Tsutsumi et al. ............. 429/19 |
| 5,372,617 A | 12/1994 | Kerrebrock et al. ........... 48/61 |
| 5,382,478 A | 1/1995 | Chow .......................... 429/26 |
| 5,514,353 A | 5/1996 | Adlhart ....................... 422/239 |
| 5,554,343 A | 9/1996 | Wade |
| 5,557,188 A | 9/1996 | Piercey ........................ 320/5 |
| 5,593,640 A | 1/1997 | Long et al. ................... 422/111 |
| 5,599,640 A | 2/1997 | Lee et al. ..................... 429/46 |
| 5,634,341 A | 6/1997 | Klanchar et al. ............. 60/673 |
| 5,683,828 A | 11/1997 | Spear et al. .................. 429/13 |
| 5,688,611 A | 11/1997 | Golben ........................ 429/53 |
| 5,702,491 A | 12/1997 | Long et al. ................... 48/197 |
| 5,728,464 A * | 3/1998 | Checketts .................... 428/403 |
| 5,747,189 A | 5/1998 | Perkins ........................ 429/91 |
| 5,756,047 A | 5/1998 | West et al. |
| 5,804,329 A | 9/1998 | Amendola .................... 429/34 |
| 5,833,934 A * | 11/1998 | Adlhart ....................... 422/239 |
| 5,843,297 A | 12/1998 | Schmid et al. ............... 205/687 |
| 5,858,587 A | 1/1999 | Yamane et al. ............... 430/22 |
| 5,861,137 A | 1/1999 | Edlund |
| 5,863,671 A | 1/1999 | Spear .......................... 429/12 |
| 5,932,365 A | 8/1999 | Lin et al. ..................... 429/12 |
| 5,948,558 A | 9/1999 | Amendola .................... 429/50 |
| 5,955,039 A | 9/1999 | Dowdy ........................ 422/189 |
| 5,962,155 A | 10/1999 | Kuranaka et al. ............. 429/20 |
| 5,976,725 A | 11/1999 | Gamo et al. .................. 429/25 |
| 5,996,976 A | 12/1999 | Murphy ....................... 261/104 |
| 5,997,594 A | 12/1999 | Edlund et al. |
| 5,997,812 A | 12/1999 | Burnham et al. |
| 6,051,128 A | 4/2000 | Nacamuli ..................... 208/79 |
| 6,051,331 A | 4/2000 | Spear, Jr. et al. .............. 429/34 |
| 6,066,409 A | 5/2000 | Ronne ......................... 429/39 |
| 6,072,299 A | 6/2000 | Kurle et al. ................... 320/112 |
| 6,090,312 A | 7/2000 | Ziaka et al. ................... 252/373 |
| 6,096,219 A | 8/2000 | Green et al. |
| 6,096,286 A | 8/2000 | Autenrieth ................... 423/651 |
| 6,097,175 A | 8/2000 | Yoon ........................... 320/132 |
| 6,106,965 A | 8/2000 | Hirano et al. ................. 429/30 |
| 6,106,968 A | 8/2000 | Johnson et al. ............... 429/50 |
| 6,108,968 A | 8/2000 | Peng ............................ 47/24 |
| 6,110,429 A | 8/2000 | Johansing, Jr. |
| 6,110,611 A | 8/2000 | Stuhler et al. ................ 429/13 |
| 6,156,450 A | 12/2000 | Bailey ......................... 429/93 |
| 6,198,253 B1 | 3/2001 | Kurle et al. ................... 320/132 |
| 6,221,117 B1 | 4/2001 | Edlund et al. |
| 6,231,825 B1 | 5/2001 | Colby et al. .................. 423/286 |
| 6,236,326 B1 | 5/2001 | Murphy ....................... 340/636 |
| 6,238,814 B1 | 5/2001 | Horiguchi et al. ............ 429/12 |
| 6,248,469 B1 | 6/2001 | Formato et al. |
| 6,250,078 B1 | 6/2001 | Amendola et al. ............ 60/509 |
| 6,268,077 B1 | 7/2001 | Kelley et al. ................. 429/33 |
| 6,274,093 B1 | 8/2001 | Long et al. ................... 422/129 |
| 6,309,611 B1 | 10/2001 | Tabatabaie-Raissi et al. |
| 6,312,848 B1 | 11/2001 | Kilb et al. .................... 429/162 |
| 6,315,870 B1 | 11/2001 | Tabatabaie-Raissi et al. |
| 6,334,936 B1 | 1/2002 | Tabatabaie-Raissi et al. |
| 6,337,120 B1 | 1/2002 | Sasaki et al. ................. 428/66.04 |
| 6,342,128 B1 | 1/2002 | Tabatabaie-Raissi et al. |
| 6,387,557 B1 | 5/2002 | Krasij et al. .................. 429/32 |
| 6,399,234 B2 | 6/2002 | Bonk et al. ................... 429/32 |
| 6,428,918 B1 | 8/2002 | Fuglevand et al. ............ 429/13 |
| 6,433,129 B1 | 8/2002 | Amendola et al. ............ 528/271 |
| 6,454,871 B1 | 9/2002 | Labib et al. |
| 6,468,682 B1 | 10/2002 | Fuglevand et al. ............ 429/26 |
| 6,468,694 B1 | 10/2002 | Amendola .................... 429/218.1 |
| 6,483,274 B2 | 11/2002 | Lee .............................. 320/132 |
| 6,495,278 B1 | 12/2002 | Schmid et al. ............... 429/30 |
| 6,497,973 B1 | 12/2002 | Amendola .................... 429/19 |
| 6,497,974 B2 | 12/2002 | Fuglevand .................... 429/22 |
| 6,500,577 B2 | 12/2002 | Foster .......................... 429/32 |
| 6,503,649 B1 | 1/2003 | Czajkowski et al. .......... 429/23 |
| 6,503,711 B1 | 1/2003 | Krull et al. |
| 6,524,542 B2 | 2/2003 | Amendola et al. ............ 423/286 |
| 6,531,630 B2 | 3/2003 | Vidalin ........................ 562/519 |
| 6,533,827 B1 | 3/2003 | Cisar et al. ................... 29/623.4 |
| 6,534,033 B1 | 3/2003 | Amendola et al. ............ 423/648.1 |
| 6,541,147 B1 | 4/2003 | McLean et al. ............... 249/35 |
| 6,544,400 B2 * | 4/2003 | Hockaday et al. ............ 205/338 |
| 6,544,679 B1 | 4/2003 | Petillo et al. ................. 429/34 |
| 6,551,561 B1 | 4/2003 | Tabatabaie-Raissi et al. |
| 6,554,400 B1 | 4/2003 | Aoki ........................... 347/47 |
| 6,576,350 B2 | 6/2003 | Buxbaum ..................... 428/670 |
| 6,582,666 B2 | 6/2003 | Tabatabaie-Raissi et al. |
| 6,586,563 B1 | 7/2003 | Ortega et al. ................. 528/394 |
| 6,599,653 B1 | 7/2003 | Cummins et al. ............. 429/35 |
| 6,602,631 B1 | 8/2003 | Cisar et al. ................... 429/34 |
| 6,607,857 B2 | 8/2003 | Blunk et al. .................. 429/34 |
| 6,610,112 B1 | 8/2003 | Klock et al. |
| 6,645,651 B2 | 11/2003 | Hockaday et al. ............ 429/19 |
| 6,649,097 B2 | 11/2003 | Sasaki et al. ................. 264/102 |
| 6,653,003 B1 | 11/2003 | Tsai et al. ..................... 429/17 |
| 6,670,444 B2 | 12/2003 | Amendola et al. ............ 528/394 |
| 6,683,025 B2 | 1/2004 | Amendola et al. ............ 502/439 |
| 6,685,570 B2 | 2/2004 | Zilberman et al. ............ 464/94 |
| 6,688,106 B2 | 2/2004 | Okusawa et al. ............. 60/653 |
| 6,703,722 B2 | 3/2004 | Christiansen ................ 307/71 |
| 6,706,909 B1 | 3/2004 | Snover et al. ................ 558/296 |
| 6,730,269 B2 | 5/2004 | Mirkin et al. |
| 6,733,916 B2 | 5/2004 | Mizuno ........................ 429/36 |
| 6,743,542 B2 | 6/2004 | Krasij et al. .................. 429/36 |
| 6,745,801 B1 | 6/2004 | Cohen et al. ................. 141/231 |
| 6,746,496 B1 * | 6/2004 | Kravitz et al. ................ 48/118.5 |
| 6,755,219 B1 | 6/2004 | Bolle ........................... 14/19 |
| 6,764,786 B2 | 7/2004 | Morrow et al. ............... 429/37 |
| 6,766,817 B2 | 7/2004 | da Silva |
| 6,770,186 B2 | 8/2004 | Rosenfeld et al. ............ 205/343 |
| 6,777,127 B2 | 8/2004 | Einhart et al. ................ 429/35 |
| 6,783,741 B2 | 8/2004 | Edlund et al. |
| 6,787,008 B2 | 9/2004 | Joshi et al. ................... 204/252 |
| 6,794,418 B2 | 9/2004 | Sogge et al. .................. 518/706 |
| 6,805,987 B2 | 10/2004 | Bai et al. ...................... 429/23 |
| 6,811,764 B2 | 11/2004 | Jorgensen et al. ............ 423/658.2 |
| 6,811,906 B2 | 11/2004 | Bai et al. ...................... 429/13 |
| 6,811,918 B2 | 11/2004 | Blunk et al. .................. 429/40 |
| 6,815,110 B2 | 11/2004 | Marsh ......................... 429/30 |

| | | | | | | |
|---|---|---|---|---|---|---|
| 6,818,334 B2 | 11/2004 | Tsang .......................... 429/17 | | 2003/0159354 A1 | 8/2003 | Edlund et al. |
| 6,821,499 B2 | 11/2004 | Jorgensen ................ 423/648.1 | | 2003/0162059 A1 | 8/2003 | Gelsey ........................ 429/17 |
| 6,827,747 B2 | 12/2004 | Lisi et al. ................... 29/623.1 | | 2003/0180603 A1 | 9/2003 | Richards ..................... 429/38 |
| 6,846,635 B1 | 1/2005 | Anderson et al. | | 2003/0194596 A1 | 10/2003 | Ye et al. ....................... 429/38 |
| 6,887,701 B2 | 5/2005 | Anderson et al. | | 2003/0204993 A1 | 11/2003 | Holland et al. .............. 48/27.9 |
| 6,899,967 B2 | 5/2005 | Johnson ........................ 429/19 | | 2003/0219371 A1 | 11/2003 | Amendola ................... 423/351 |
| 6,901,302 B2 | 5/2005 | Kami ........................... 700/90 | | 2003/0219641 A1 | 11/2003 | Petillo .......................... 429/38 |
| 6,904,533 B2 | 6/2005 | Kuo et al. .................... 713/322 | | 2003/0223926 A1 | 12/2003 | Edlund et al. |
| 6,918,404 B2 | 7/2005 | Dias da Silva | | 2003/0226763 A1 | 12/2003 | Narayanan et al. .......... 205/637 |
| 6,932,847 B2 | 8/2005 | Amendola et al. ............. 48/76 | | 2003/0228252 A1 | 12/2003 | Shurtleff ..................... 423/657 |
| 6,939,529 B2 | 9/2005 | Strizki et al. ............. 423/658.2 | | 2003/0228505 A1 | 12/2003 | Tsang ........................... 429/19 |
| 7,004,207 B2 | 2/2006 | Finkelshtain et al. | | 2003/0232225 A1 | 12/2003 | Maruyama et al. ............ 429/22 |
| 7,019,105 B2 | 3/2006 | Amendola et al. ........... 528/271 | | 2003/0235724 A1 * | 12/2003 | Ord et al. ...................... 429/19 |
| 7,052,671 B2 | 5/2006 | McClaine et al. ......... 423/658.2 | | 2003/0235749 A1 | 12/2003 | Haltiner, Jr. et al. ........... 429/38 |
| 7,052,793 B2 | 5/2006 | Formato et al. | | 2004/0005488 A1 | 1/2004 | Faris et al. .................... 429/23 |
| 7,066,586 B2 | 6/2006 | da Silva | | 2004/0009379 A1 | 1/2004 | Amendola et al. ........... 429/17 |
| 7,074,369 B2 | 7/2006 | Tabatabaie-Raissi et al. | | 2004/0009392 A1 | 1/2004 | Petillo et al. ................ 429/122 |
| 7,074,509 B2 | 7/2006 | Rosenfeld ..................... 429/19 | | 2004/0011662 A1 | 1/2004 | Xu et al. ...................... 205/408 |
| 7,083,657 B2 * | 8/2006 | Mohring et al. ................ 48/61 | | 2004/0025808 A1 | 2/2004 | Cheng ............................ 123/3 |
| 7,097,813 B2 | 8/2006 | Ord et al. | | 2004/0031695 A1 | 2/2004 | Oloman et al. .............. 205/615 |
| 7,105,033 B2 | 9/2006 | Strizki et al. ................... 48/61 | | 2004/0033194 A1 | 2/2004 | Amendola et al. ........ 423/658.2 |
| 7,108,777 B2 | 9/2006 | Xu et al. ...................... 205/408 | | 2004/0035054 A1 | 2/2004 | Mohring et al. ................ 48/61 |
| 7,147,692 B2 | 12/2006 | Fornai et al. | | 2004/0043274 A1 | 3/2004 | Scartozzi et al. .............. 429/34 |
| 7,179,638 B2 | 2/2007 | Anderson et al. | | 2004/0047801 A1 | 3/2004 | Petillo et al. ................ 423/657 |
| 7,259,019 B2 | 8/2007 | Pawliszyn et al. | | 2004/0052723 A1 | 3/2004 | Jorgensen ................ 423/648.1 |
| 7,285,255 B2 | 10/2007 | Kadlec et al. | | 2004/0053100 A1 | 3/2004 | Stanley et al. ................. 429/30 |
| 7,291,191 B2 | 11/2007 | Kaye | | 2004/0065865 A1 | 4/2004 | Desgardin et al. ....... 252/188.25 |
| 7,393,369 B2 * | 7/2008 | Shurtleff ......................... 48/61 | | 2004/0067195 A1 | 4/2004 | Strizki et al. ............. 423/658.2 |
| 2001/0000380 A1 | 4/2001 | Buxbaum | | 2004/0072041 A1 | 4/2004 | Koschany ..................... 429/23 |
| 2001/0025289 A1 | 9/2001 | Jenkins et al. .............. 708/141 | | 2004/0081884 A1 | 4/2004 | Bean et al. .................... 429/98 |
| 2001/0043274 A1 | 11/2001 | Shepherd et al. ........... 348/241 | | 2004/0109374 A1 | 6/2004 | Sundar ........................ 365/226 |
| 2001/0045061 A1 | 11/2001 | Edlund et al. | | 2004/0115493 A1 | 6/2004 | Kim .............................. 429/20 |
| 2001/0045364 A1 | 11/2001 | Hockaday et al. ........... 205/338 | | 2004/0120889 A1 | 6/2004 | Shah et al. ................... 423/657 |
| 2001/0046616 A1 | 11/2001 | Mossman ..................... 429/13 | | 2004/0121196 A1 | 6/2004 | Liu et al. ....................... 429/12 |
| 2001/0050218 A1 | 12/2001 | Tabatabaie-Raissi et al. | | 2004/0146769 A1 | 7/2004 | Birschbach |
| 2002/0001537 A1 | 1/2002 | Hlebovy et al. | | 2004/0148857 A1 | 8/2004 | Strizki et al. ............... 48/127.9 |
| 2002/0018742 A1 | 2/2002 | Hoke et al. | | 2004/0160814 A1 | 8/2004 | Speranza et al. ............ 320/140 |
| 2002/0022162 A1 | 2/2002 | Kagitani ........................ 429/17 | | 2004/0161646 A1 | 8/2004 | Rezachek et al. ............. 429/19 |
| 2002/0022168 A1 | 2/2002 | Faris et al. ..................... 429/27 | | 2004/0161652 A1 | 8/2004 | Ovshinsky et al. ............ 429/34 |
| 2002/0022170 A1 | 2/2002 | Franklin et al. ............... 429/34 | | 2004/0166057 A1 | 8/2004 | Schell et al. .............. 423/658.2 |
| 2002/0045075 A1 | 4/2002 | Pinto et al. .................... 429/15 | | 2004/0180247 A1 | 9/2004 | Higashiyama et al. ........ 429/19 |
| 2002/0045082 A1 | 4/2002 | Marsh ........................... 429/30 | | 2004/0180253 A1 | 9/2004 | Fisher ........................... 429/34 |
| 2002/0045085 A1 | 4/2002 | Formato et al. | | 2004/0191152 A1 | 9/2004 | Amendola et al. ........... 423/288 |
| 2002/0058168 A1 | 5/2002 | Voss et al. ..................... 429/13 | | 2004/0191588 A1 | 9/2004 | Eshraghi et al. .............. 429/19 |
| 2002/0076598 A1 | 6/2002 | Bostaph et al. ................ 429/38 | | 2004/0200903 A1 | 10/2004 | Ohya et al. .................. 235/492 |
| 2002/0083643 A1 | 7/2002 | Amendola et al. ............. 48/61 | | 2004/0214056 A1 | 10/2004 | Gore ............................. 429/20 |
| 2002/0106313 A1 | 8/2002 | Tabatabaie-Raissi et al. | | 2004/0214057 A1 | 10/2004 | Fuglevand et al. ............ 429/20 |
| 2002/0106541 A1 | 8/2002 | Yamada et al. ................ 429/21 | | 2004/0219398 A1 | 11/2004 | Calhoon ....................... 429/13 |
| 2002/0106550 A1 | 8/2002 | Nishiki et al. ................. 429/42 | | 2004/0219399 A1 | 11/2004 | Zhu et al. ...................... 429/13 |
| 2002/0136937 A1 | 9/2002 | Kelley et al. | | 2004/0253496 A1 | 12/2004 | Foster ........................... 429/30 |
| 2002/0150804 A1 | 10/2002 | Srinivasan et al. ............ 429/32 | | 2005/0008908 A1 | 1/2005 | Kaye et al. |
| 2002/0165417 A1 | 11/2002 | Numaguchi et al. .......... 585/310 | | 2005/0013771 A1 | 1/2005 | Amendola ................ 423/658.2 |
| 2002/0166286 A1 | 11/2002 | McClaine et al. ............. 48/197 | | 2005/0014044 A1 | 1/2005 | Thirukkovalur et al. ....... 429/26 |
| 2002/0171021 A1 | 11/2002 | Goretti ........................ 248/455 | | 2005/0016840 A1 | 1/2005 | Petillo ......................... 204/248 |
| 2002/0177015 A1 | 11/2002 | Fuglevand .................... 429/12 | | 2005/0017216 A1 | 1/2005 | Poetsch et al. ........... 252/299.61 |
| 2002/0177018 A1 | 11/2002 | Fuglevand .................... 429/12 | | 2005/0017646 A1 | 1/2005 | Boulos et al. ........... 315/111.41 |
| 2002/0177042 A1 | 11/2002 | Amendola ................. 429/218.1 | | 2005/0031925 A1 | 2/2005 | Ofer et al. |
| 2002/0182470 A1 | 12/2002 | Agizy et al. ................... 429/34 | | 2005/0038267 A1 | 2/2005 | Poetsch et al. .............. 549/294 |
| 2003/0003038 A1 | 1/2003 | Amendola et al. ........... 423/286 | | 2005/0058595 A1 | 3/2005 | Shi et al. ..................... 423/657 |
| 2003/0008187 A1 | 1/2003 | Higashiyama et al. ........ 429/19 | | 2005/0058990 A1 | 3/2005 | Guia et al. |
| 2003/0008194 A1 | 1/2003 | Cargneli et al. ............... 429/39 | | 2005/0124016 A1 | 6/2005 | LaDu et al. ................. 435/7.92 |
| 2003/0009942 A1 | 1/2003 | Amendola et al. ............. 48/61 | | 2005/0132640 A1 | 6/2005 | Kelly et al. .................... 44/301 |
| 2003/0012999 A1 | 1/2003 | Yoshioka et al. .............. 429/34 | | 2005/0135996 A1 | 6/2005 | Ortega et al. .............. 423/648.1 |
| 2003/0037487 A1 | 2/2003 | Amendola et al. ............. 48/76 | | 2005/0136300 A1 | 6/2005 | Dyer |
| 2003/0049857 A1 | 3/2003 | Chan | | 2005/0148091 A1 | 7/2005 | Kitaguchi et al. |
| 2003/0051785 A1 | 3/2003 | Gauthier et al. | | 2005/0162122 A1 | 7/2005 | Dunn et al. .................. 320/101 |
| 2003/0085111 A1 | 5/2003 | Tabatabaie-Raissi et al. | | 2005/0233184 A1 | 10/2005 | Dunn et al. .................... 429/12 |
| 2003/0091882 A1 | 5/2003 | Schmidt et al. ................ 429/23 | | 2005/0238573 A1 | 10/2005 | Zhang et al. .............. 423/648.1 |
| 2003/0092877 A1 | 5/2003 | Amendola et al. ........... 528/394 | | 2005/0247552 A1 | 11/2005 | TeGrotenhuis et al. |
| 2003/0098258 A1 | 5/2003 | Gregory et al. .............. 208/89 | | 2005/0268555 A1 | 12/2005 | Amendola et al. ............. 48/61 |
| 2003/0111908 A1 | 6/2003 | Christensen ................ 307/43 | | 2005/0271905 A1 | 12/2005 | Dunn et al. .................... 429/11 |
| 2003/0113259 A1 | 6/2003 | Rusta-Sallehy et al. ... 423/658.2 | | 2005/0276727 A1 | 12/2005 | Pawliszyn et al. |
| 2003/0114632 A1 | 6/2003 | Ortega et al. ................. 528/196 | | 2005/0276746 A1 | 12/2005 | Zhang et al. ................ 423/651 |

| | | |
|---|---|---|
| 2006/0008687 A1 | 1/2006 | Kaye et al. |
| 2006/0014069 A1 | 1/2006 | Kaye et al. |
| 2006/0014070 A1 | 1/2006 | Kaye et al. |
| 2006/0021279 A1 | 2/2006 | Mohring et al. ............... 48/61 |
| 2006/0024543 A1 | 2/2006 | Kaye et al. |
| 2006/0024553 A1 | 2/2006 | Kaye et al. |
| 2006/0024554 A1 | 2/2006 | Kaye et al. |
| 2006/0058527 A1 | 3/2006 | Kirsch et al. ............... 544/333 |
| 2006/0059778 A1 | 3/2006 | Shurtleff et al. |
| 2006/0073365 A1 | 4/2006 | Kaye |
| 2006/0090397 A1 | 5/2006 | Edlund et al. |
| 2006/0102489 A1 | 5/2006 | Kelly ............... 205/357 |
| 2006/0102491 A1 | 5/2006 | Kelly et al. ............... 205/407 |
| 2006/0144701 A1 | 7/2006 | Kelly ............... 204/267 |
| 2006/0169593 A1 | 8/2006 | Xu et al. ............... 205/406 |
| 2006/0191198 A1* | 8/2006 | Rosenzweig et al. ........... 48/61 |
| 2006/0191199 A1* | 8/2006 | Rosenzweig et al. ........... 48/61 |
| 2006/0196112 A1 | 9/2006 | Berry et al. ............... 44/550 |
| 2006/0210841 A1 | 9/2006 | Wallace et al. ............... 429/12 |
| 2006/0225350 A1 | 10/2006 | Spallone et al. ............ 48/198.2 |
| 2006/0236606 A1 | 10/2006 | Strizki et al. ............... 48/127.9 |
| 2006/0269470 A1 | 11/2006 | Zhang et al. ............. 423/648.1 |
| 2006/0292067 A1 | 12/2006 | Zhang et al. ............. 423/648.1 |
| 2006/0292420 A1 | 12/2006 | Goto et al. |
| 2006/0293173 A1 | 12/2006 | Zhang et al. ............... 502/182 |
| 2007/0011251 A1 | 1/2007 | McNamara et al. ......... 709/206 |
| 2007/0020510 A1 | 1/2007 | Dunn et al. ............... 429/65 |
| 2007/0099039 A1 | 5/2007 | Galloway |
| 2007/0116600 A1 | 5/2007 | Kochar et al. |
| 2007/0212281 A1 | 9/2007 | Kadlec et al. |
| 2007/0243431 A1 | 10/2007 | Zhu et al. |
| 2007/0244324 A1 | 10/2007 | Brady et al. |
| 2007/0274904 A1 | 11/2007 | Popham et al. |
| 2007/0287054 A1 | 12/2007 | Ueda et al. |
| 2008/0015361 A1 | 1/2008 | Khare et al. |
| 2008/0063913 A1 | 3/2008 | Hirayama |

OTHER PUBLICATIONS

"VI.B.4 DOE Chemical Hydrogen Storage Center of Excellence" Tumas, W. et al., FY 2005 Progress Report.

"Review of Chemical Processes for the Synthesis of Sodium Borohydride" Wo, Y. et al., Millennium Cell Inc., Aug. 2004.

"A safe, portable, hydrogen gas generator using aqueous borohydride solution and Ru catalyst" Amendola, S.C. et al., International Journal of Hydrogen Energy 25 (2000) 969-975.

Messina-Boyer, Chris. "Millennium Cell Receives Patent on System for Hydrogen Generation," Millennium Cell, Inc., Eatontown, NEWS, Mar. 18, 2003.

"A Novel High Power Density Borohydride-Air Cell," Amendola S.C. et al., Journal of Power Sources, vol. 84, No. 1, Nov. 1999, pp. 130-133(4).

"Enabling Fuel Cells for Standby Power-Chemical Hydride Fueling Technology," Smith, G.M., et al. Millennium Cell Inc., Eatontown, Telecommunications Energy Conference, 2004, Sep. 19-23, 2004.

"Recent Advances in Hydrogen Storage in Metal-Containing Inorgainc Nanostructures and Related Materials," Seayad, A.M., et al. Copyright 2004 May 19, 2004.

"Hydrogn Generation Via Sodium Borohydride," Mohring, R.M., et al. Millennium Cell, Inc., Eatontown, AIP Conference Proceedings-Jul. 11, 2003-vol. 671, Issue 1, pp. 90-100.

"Solid Storage," Luzader, R., Millennium Cell, Inc., Eatontown, NEWS, Jun./Jul. 2003.

"Will Fuel Cells Replace Batteries in Mobile Devices?" Paulson, L.D. Millennium Cell, Inc.'.

Amendola et al., "A Safe, Portable, Hydrogen Gas Generator Using Aqueous Borohydride Solution and Ru Catalyst", International Journal of Hydrogen Energy, 2000, 25, pp. 969-975.

"Catalytic Reformer and Refinery Hydrogen System," Pall Corporation Copyright 1996, East Hills, New York.

"Dollinger Hydrogen Purification System," B & H Dollinger Filters, May 8, 2008, http://www.bhindust.com/dollinger/Dollinger_Hydrogen_Purification_System.htm.

"Recovery and Purification of Hydrogen Using PSA Technology," NATCO, May 8, 2008, http://www.natcogroup.com/Content.asp?t=ProductPage&ProductID=70.

QuestAir H-3200: Hydrogen Purification PSA System, QuestAir Technologies, British Columbia, Canada 2008.

* cited by examiner

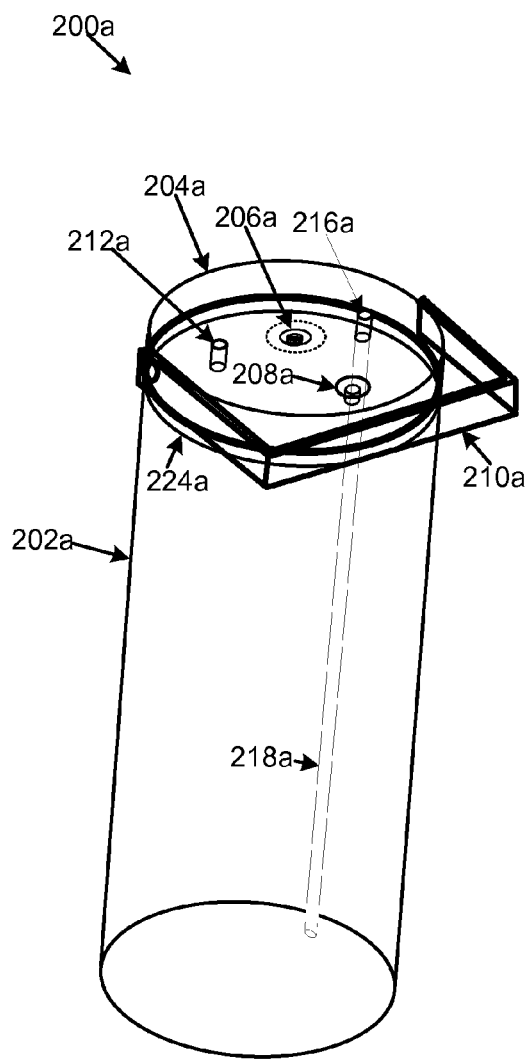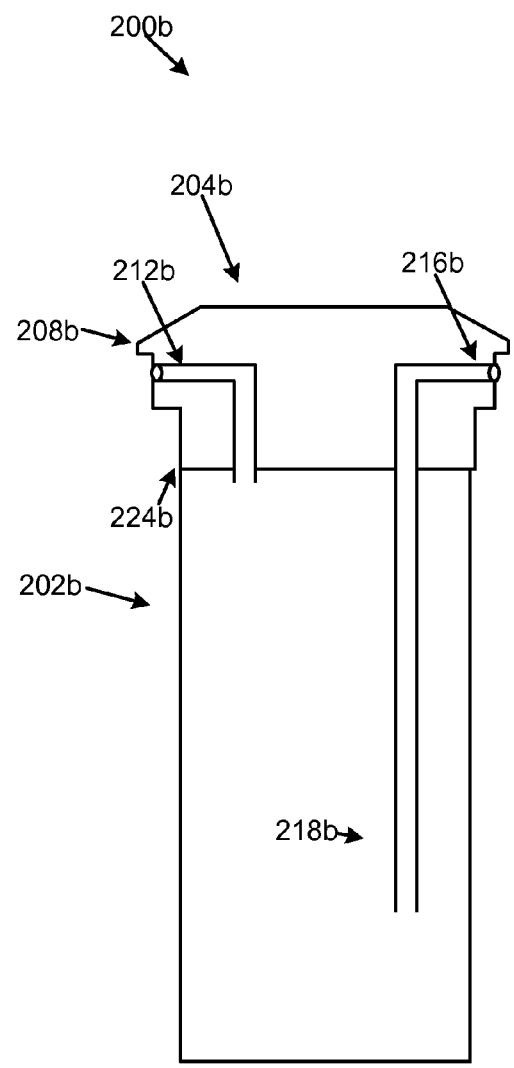
FIG. 2A
FIG. 2B

SYSTEM FOR GENERATING HYDROGEN FROM A CHEMICAL HYDRIDE

CROSS-REFERENCES TO RELATED APPLICATIONS

This application claims the benefit of U.S. Provisional Patent Application No. 60/820,574 entitled "APPARATUS, SYSTEM, AND METHOD FOR GENERATING ELECTRICITY FROM A CHEMICAL HYDRIDE" and filed on Jul. 27, 2006 for Kevin Shurtleff, et. al which is incorporated herein by reference. This application incorporates by reference U.S. Pat. Nos. 7,393,369 filed Jun. 11, 2003, U.S. Pat. No. 7,438,732 filed Nov. 12, 2005, U.S. patent application Ser. Nos. 11/740,349 filed Apr. 26, 2007, and U.S. patent application Ser. No. 11/828,265 filed Jul. 25, 2007; and U.S. Provisional Patent Applications Ser. No. 60/820,574 filed Jul. 27, 2006, 60/951,903 filed Jul. 25, 2007, 60/951,907 filed Jul. 25, 2007, and 60/951,925 filed Jul. 25, 2007, each of which is incorporated by reference herein in its entirety.

BACKGROUND OF THE INVENTION

1. Field of the Invention

This invention relates to hydrogen generation and more particularly relates to hydrogen generation from a chemical hydride.

2. Description of the Related Art

As the cost of fossil fuels increases, pollution increases, and the worldwide supply of fossil fuels decreases, alternative energy sources are becoming increasingly important. Hydrogen is a plentiful alternative energy source, but it generally exists in a combination with other elements, and not in a pure form. The additional elements add mass and may prevent the hydrogen from being used as an energy source. Pure hydrogen, however, is a desirable energy source. Pure hydrogen comprises free hydrogen atoms, or molecules comprising only hydrogen atoms. Producing pure hydrogen using conventional methods is generally cost prohibitive.

One way that pure hydrogen can be generated is by a chemical reaction which produces hydrogen molecules. The chemical reaction that occurs between water ($H_2O$) and chemical hydrides produces pure hydrogen. Chemical hydrides are molecules comprising hydrogen and one or more alkali or alkali-earth metals. Examples of chemical hydrides include lithium hydride (LiH), lithium tetrahydridoaluminate ($LiAlH_4$), lithium tetrahydridoborate ($LiBH_4$), sodium hydride (NaH), sodium tetrahydridoaluminate ($NaAlH_4$), sodium tetrahydridoborate ($NaBH_4$), and the like. Chemical hydrides produce large quantities of pure hydrogen when reacted with water, as shown in reaction 1.

$$NaBH_4 + 2H_2O \rightarrow NaBO_2 + 4H_2 \quad (1)$$

Recently, the interest in hydrogen generation has increased, because of the development of lightweight, compact Proton Exchange Membrane (PEM) fuel cells. One by-product of generating electricity with a PEM fuel cell is water, which can be used or reused to produce pure hydrogen from chemical hydrides for fuelling the PEM fuel cell. The combination of PEM fuel cells with a chemical hydride hydrogen generator offers advantages over other energy storage devices in terms of gravimetric and volumetric energy density.

Unfortunately, the prior art has encountered unresolved problems producing pure hydrogen from chemical water/hydride reactions. Specifically, conventional systems, methods, and apparatuses have not successfully controlled the chemical reaction between the water and the chemical hydride without adversely affecting the gravimetric and volumetric energy density of the overall system.

The chemical reaction between water and a chemical hydride is very severe and highly exothermic. The combination of water and a chemical hydride must be precisely controlled to prevent a runaway reaction or an explosion. Many failed attempts have been made to properly control the reaction while still preserving the gravimetric and volumetric energy density provided by the chemical hydrides One attempt to properly control the reaction involves separating water from the chemical hydride using a membrane. Generally, the membrane passes water because of a difference in water pressure across the membrane. Water pressure on the side of the membrane opposite the chemical hydride pushes water through the membrane, because water is quickly used up in the reaction with the chemical hydride. Other membranes utilize a capillary action to transport water from one side of the membrane to the other. Consequently, a water supply must be provided that supplies water to the water side of the membrane to be transported by capillary action to the chemical hydride side of the membrane.

One side effect of such a system is that the chemical hydride will "gum" or "clump" as water is introduced. Gumming or clumping refers to the spheres or other geometric shapes formed by the chemical hydride and its byproducts during the reaction. Water is able to react with the outer portion of the "clump" to a certain depth, however, large portions of the "clump" remain unreacted because water cannot penetrate deeply enough into the "clump." Consequently, the gravimetric and volumetric energy density is decreased because of the large percentage of the chemical hydride that remains unreacted. This is inefficient and unacceptable.

Accordingly, what is needed is an improved apparatus that overcomes the problems and disadvantages of the prior art. The apparatus should promote a substantially complete and controlled reaction of an anhydrous hydride reactant. In particular, the apparatus should control a chemical reaction between water and a chemical hydride without relying on a water pressure differential across a membrane.

SUMMARY OF THE INVENTION

The present invention has been developed in response to the present state of the art, and in particular, in response to the problems and needs in the art that have not yet been fully solved by currently available hydrogen generation systems. Accordingly, the present invention has been developed to provide an apparatus for generating hydrogen from a chemical hydride that overcome many or all of the above-discussed shortcomings in the art.

The apparatus to generate hydrogen is provided with a plurality of modules configured to functionally execute the necessary steps of hydrogen production from a chemical hydride. These modules in the described embodiments include a liquid permeable material, a housing, one or more liquid sources, a gas outlet port, a hydrogen output regulator, a liquid reservoir, one or more pumps, a liner, a crimp, an end cap, an activated charcoal filter, one or more housing alignment features, and an O-ring.

In one embodiment, the liquid permeable material has one or more cavities, each cavity containing a solid anhydrous chemical hydride and an anhydrous activating agent. The cavities, in one embodiment, are one or more tubular pouches in a side-by-side configuration. In another embodiment, the tubular pouches are rolled such that a longitudinal axis of the rolled one or more tubular pouches oriented coaxial with a longitudinal axis of the housing In a further embodiment, the housing comprises a heat and pressure resistant material. The housing receives the liquid permeable material, and a liquid. In one embodiment, the housing has a crimp that circumscribes the end cap that is seated within a housing opening. The crimp releases the hydrogen gas in response to a gas pressure above a predetermined gas pressure. The housing, in one embodiment, has an activated charcoal filter that absorbs impurities from hydrogen gas exiting the housing. In a further embodiment, the housing is cylindrical.

In another embodiment, the one or more liquid sources inject the liquid into the housing such that the liquid contacts at least a portion of the liquid permeable material. In one embodiment, the liquid comprises water. In one embodiment, the liquid sources comprise one or more liquid conduits disposed within the housing.

The gas outlet port, in one embodiment, releases hydrogen gas produced by a reaction between the solid anhydrous chemical hydride, the anhydrous activating agent, and the liquid. In one embodiment, the hydrogen output regulator controls the amount of hydrogen gas that the gas outlet port releases. In another embodiment, the hydrogen output regulator comprises a check valve that allows the hydrogen gas to exit the gas outlet port, but prevents the hydrogen gas from entering the gas outlet port. In a further embodiment, the hydrogen output regulator regulates a gas pressure of the hydrogen gas that the gas outlet port releases such that the gas pressure remains at or below a predetermined gas pressure. In one embodiment, the one or more liquid sources comprise a liquid reservoir and one or more pumps, each of the one or more pumps configured to pump liquid from the liquid reservoir into the housing at a liquid injection rate. In another embodiment, the hydrogen output regulator comprises a controller that manages the liquid injection rate.

In another embodiment, the liner is disposed between the housing and the liquid permeable material. The liner protects the housing from corrosion and damage.

The housing alignment features, in one embodiment, ensure that the housing is disposed in a predetermined position and alignment relative to one or more receiving alignment features of an apparatus receiver. In another embodiment, the one or more housing alignment features comprise a handle. In a further embodiment, the one or more housing alignment features engage the gas outlet port. In one embodiment, the O-ring circumscribes the gas outlet port to produce a seal between the gas outlet port and a receiver gas port. The O-ring breaks the seal and releases the hydrogen gas in response to a gas pressure above a predetermined gas pressure.

A system of the present invention is also presented to generate hydrogen. The system may be embodied by a fuel cartridge, a cartridge interface, and a fuel cartridge receiver. In particular, the fuel cartridge, in one embodiment, includes a liquid permeable material, a housing, and one or more liquid sources.

The system may further include a cartridge cooling module, a condenser, one or more alignment sensors, one or more temperature sensors, one or more pressure sensors, a state of fill module, a radio frequency identification tag, a bar code, a memory, a liquid reservoir, and one or more pumps.

Another apparatus of the present invention is also presented to generate hydrogen. The apparatus in the disclosed embodiments substantially includes the elements presented above with respect to the operation of the described apparatus and system.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 2A is a schematic block diagram illustrating one embodiment of a hydrogen fuel cartridge in accordance with the present invention;

FIG. 2B is a schematic block diagram illustrating another embodiment of a hydrogen fuel cartridge in accordance with the present invention;

DETAILED DESCRIPTION OF THE INVENTION

Figure 1:
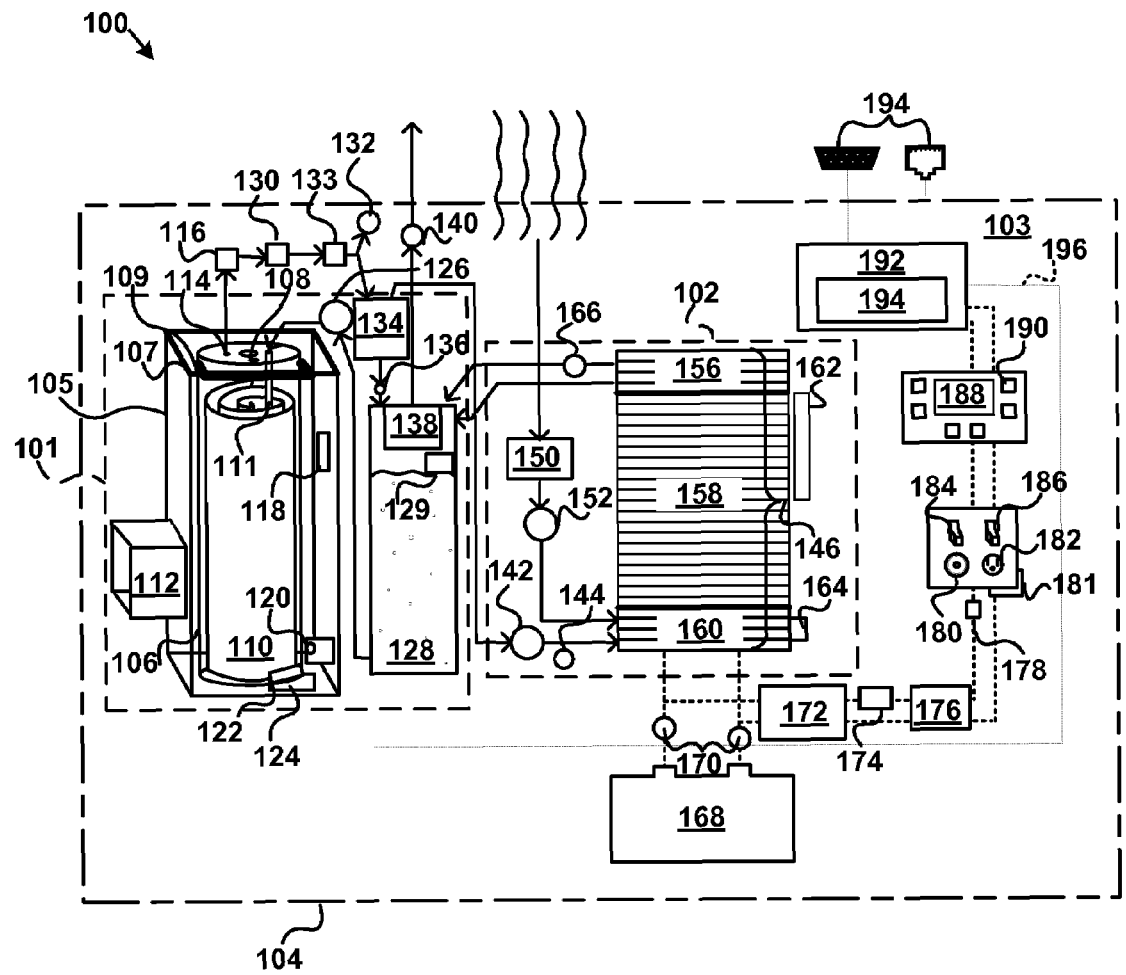
FIG. 1 is a schematic block diagram illustrating one embodiment of a system for generating electricity from a chemical hydride in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts one embodiment of a system 100 for generating electricity from a chemical hydride in accordance with the present invention. The system 100 includes a hydrogen generation system 101, a hydrogen consuming device 102, an electrical and control system 103, and an outer housing 104.

In one embodiment, the hydrogen generation system 101 includes one or more cartridge receivers 105, one or more hydrogen fuel cartridges 106, a housing lid 107, one or more locking and alignment structures 108, a handle 109, a liquid permeable material 110, one or more liquid injection lines and tubes 111, one or more cooling modules 112, one or more hydrogen ports 114, an activated charcoal filter 116, a temperature sensor 118, a cartridge sensor 120, a radio frequency identification (RFID) tag 122, an RFID sensor 124, a pump 126, a liquid reservoir 128, a level sensor 129, a check valve 130, a hydrogen pressure sensor 132, one or more mechanical valves 133, a water trap 134, a transfer valve 136, a condenser 138, and an air pressure control valve 140. In general, the hydrogen generation system 101 generates hydrogen using a liquid such as water, a chemical hydride, and an activating agent.

In one embodiment, the cartridge receiver 105 comprises a durable material that can withstand high temperatures associated with hydrogen generation. In a further embodiment, the cartridge receiver 105 also comprises a lightweight material, to keep the overall weight of the system 100 to a minimum for added portability. In one embodiment, the cartridge receiver 105 is a lightweight metal or metal alloy such as aluminum or the like. In a further embodiment, the cartridge receiver 105 comprises a fiberglass material, a plastic polymer material, a ceramic material, or another durable material. In one embodiment, the cartridge receiver 105 also comprises a housing lid 107 and other structures configured to receive, align, and lock the hydrogen fuel cartridge 106.

In one embodiment, the hydrogen fuel cartridge 106 locks into the cartridge receiver 105. The hydrogen fuel cartridge 106 is discussed in greater detail with reference to FIG. 2. In general, the hydrogen fuel cartridge 106 is configured to house a chemical hydride and an activating agent, to receive a liquid such as water, to house a chemical reaction between the chemical hydride and the liquid which produces hydrogen gas, and to release the hydrogen gas.

In one embodiment, the hydrogen fuel cartridge 106 is cylindrical in shape. The cylindrical shape provides structural strength to withstand the internal pressures as hydrogen is produced. The hydrogen fuel cartridge 106 may comprise a material configured to withstand the heat and pressure of the chemical reaction. The material may also comprise a lightweight material selected to minimize the weight of the hydrogen fuel cartridge 106, such as a lightweight metal or metal alloy like aluminum, a plastic polymer, or other durable material. In another embodiment, the hydrogen fuel cartridge 106 comprises a stamped aluminum cylindrical cartridge.

In another embodiment, the hydrogen fuel cartridge 106 comprises a removable and/or disposable material such as a flexible plastic polymer that may be substantially similar to the liner discussed below, and the cartridge receiver 105 may comprise a more durable outer housing comprising a metal or metal alloy, a ceramic, a rigid plastic polymer or the like. The durable outer housing may include a screw on cap that secures the removable and/or disposable hydrogen fuel cartridge 106.

The housing lid 107, in one embodiment, closes to secure the hydrogen fuel cartridge 106 in the cartridge housing 105. In another embodiment, the housing lid 107 may act as a backup securing system for the hydrogen cartridge 106. For example, the hydrogen fuel cartridge 106 may be secured to the cartridge housing 105 by a securing mechanism (not shown), and the housing lid 107 may close on the installed hydrogen fuel cartridge 106 to provide added security in the event of a failure of the securing mechanism (not shown).

In another embodiment, the housing lid 107 locks and aligns the hydrogen fuel cartridge 106. The housing lid 107 may have various structures formed thereon and within for mating with the hydrogen fuel cartridge 106. Within the housing lid 107 may be alignment structures, guide blocks, guide pins, or the like which may mate with corresponding alignment structures 108 on the hydrogen fuel cartridge 106. In another embodiment, the cartridge receiver 105 may include alignment structures, guide blocks, guide pins, or the like which may mate with corresponding alignment structures 108 on the hydrogen fuel cartridge 106. Additionally, the housing lid 107 may include one or more port connectors configured to mate with one or more liquid conduits 111, and one or more hydrogen ports 114.

In one embodiment, indentions around port connectors in the housing lid 107 will accommodate sealing devices such as O-rings or gaskets. In one embodiment, lines, manifolds, tubing or the like may be in fluid communication with one or more liquid passages in the housing lid 107 and with a liquid source, and thereby provide fluid communication through the housing lid 107 to one or more liquid ports 108 on the hydrogen fuel cartridge 106. In certain embodiments, the lines, manifolds, tubing or the like are coupled to another manifold (not shown) that distributes the liquid to the housing lid 107. In one embodiment, the housing lid 107 will include internal liquid passages. In another embodiment, the cartridge receiver 105 may comprise one or more lines, manifolds, tubes and the like in fluid communication with one or more liquid passages in the housing lid 107 and with a liquid source.

In one embodiment, the hydrogen generation system 101 includes alignment structures 108, a shoulder, guide blocks, guide pins, or the like which may mate with corresponding alignment structures 108 on the hydrogen fuel cartridge 106. In another embodiment, the cartridge housing 105 may include alignment structures 108, guide blocks, guide pins, or the like which may mate with corresponding alignment structures 108 on the hydrogen fuel cartridge 106.

In one embodiment, the top of the hydrogen fuel cartridge 106 has one or more locking and alignment structures 108. In one embodiment, the one or more locking and alignment structures 108 are configured to engage one or more corresponding locking and alignment structures 108 of the cartridge receiver 105. The locking and alignment structures 108 of the cartridge receiver 105 may be a shoulder, guide blocks, pins, bolts, screws, keys, or the like. In one embodiment, the locking and alignment structures 108 comprise a threaded hole and a non-threaded hole. In one embodiment the threaded hole is configured to accept a bolt or screw attached to a handle on the top lid of the cartridge housing 105. In one embodiment, a bolt, screw, or quarter turn lock in the housing lid 107 locks into a threaded or ramped hole 108 in the hydrogen fuel cartridge 106 with a quarter turn of the handle.

Advantageously, the locking and alignment structures 108 provide for quick and safe installation of a fresh hydrogen fuel cartridge 106. In one embodiment, the hydrogen fuel cartridge 106 is oriented vertically with respect to the outer housing 104. In this manner, a user may quickly remove a used hydrogen fuel cartridge 106 and insert a fresh hydrogen fuel cartridge 106. In a further embodiment, the hydrogen fuel cartridge 106 is oriented horizontally with respect to the outer housing 104. The locking and alignment structures 108 ensure that inlet ports of the hydrogen fuel cartridge 106 line up and seal properly. In one embodiment, improper positioning of the hydrogen fuel cartridge 106 causes the cartridge 106 to extend beyond the cartridge receiver 105. Consequently, the housing lid 107 will not close. The user may then spin the hydrogen fuel cartridge 106 about its center axis until the locking and alignment structures 108 align and the hydrogen fuel cartridge 106 properly seats within the cartridge receiver 105.

In one embodiment, a top portion of the hydrogen fuel cartridge 106 has a handle 109. The handle 109 may comprise a durable plastic, metal, or other material. In one embodiment, the handle 109 is configured to pivot along a 90 degree arc, between a position perpendicular to the top of the hydrogen fuel cartridge 106, and a position parallel to the top of the hydrogen fuel cartridge 106.

The handle 109 may also serve as a locking and alignment structure 108. In such an embodiment, the handle 109 fits into a corresponding space in the cartridge receiver 105 and/or the housing lid 107 of the cartridge housing 105 only when the hydrogen fuel cartridge 106 is properly positioned about its center vertical axis and the handle 109 is positioned within the plane of the top of the hydrogen fuel cartridge 106. In this position, the handle 109 allows the housing lid 107 to close and lock. The handle 109 restricts the rotation of the hydrogen fuel cartridge 106 and ensures a proper alignment of the hydrogen fuel cartridge 106 within the cartridge housing 105.

In one embodiment, the chemical hydride and the activating agent are stored in a liquid permeable material 110 within the hydrogen fuel cartridge 106. The liquid permeable material 110 is discussed in greater detail with reference to FIGS. 3A and 3B. In general, the liquid permeable material 110 comprises a material configured to distribute a liquid evenly, without retaining a significant amount of the liquid. In a further embodiment, the liquid permeable material 110 is further configured with one or more sections, pouches, or cavities, each section, pouch, or cavity configured to hold and to evenly distribute a predetermined amount of the chemical hydride and the activating agent. The liquid permeable material 110 may be rolled as illustrated in FIG. 1, or may be in multiple rolls, folds, stacks, or other configurations. In one embodiment, the hydrogen fuel cartridge 106 includes a plurality of liquid permeable materials 110, each rolled as illustrated in FIG. 1, and distributed about a central longitudinal axis of the hydrogen fuel cartridge 106, with a central rolled liquid permeable material 110 centered about the central longitudinal axis of the hydrogen fuel cartridge 106.

In one embodiment, a liquid such as water enters the hydrogen fuel cartridge 106 through one or more liquid conduits 111. The liquid conduits 111 may comprise tubes, integrated passages, ports, and the like. As described above, in one embodiment the liquid conduits 111 may be removably coupled to the housing lid 107 with an O-ring or similar seal, and the housing lid 107 may be coupled to the pump 126 by one or more lines, manifolds, tubes and the like. In another embodiment, the liquid conduits 111 may be removably coupled to the housing lid 107 with an O-ring or similar seal, and the housing lid 107 may be coupled to the pump 126 by one or more lines, manifolds, tubes and the like. The liquid conduits 111 may be configured to disperse a liquid such as water within the liquid permeable material 110, such that the liquid and the chemical hydride react to release hydrogen gas.

In one embodiment, the cartridge 106 is oriented vertically, and the liquid conduits 111 are configured to fill the cartridge 106 with a liquid such as water from the bottom of the cartridge 106. In a further embodiment, the cartridge 106 is oriented horizontally, and the liquid conduits 111 are configured to evenly disperse a liquid such as water in the horizontal cartridge 106. In one embodiment, the hydrogen fuel cartridge 106 may comprise a plurality of liquid conduits 111. In another embodiment, the hydrogen fuel cartridge 106 includes one or more switching valves allowing a liquid such as water to be selectively injected through one or more of the liquid conduits 111 and not through other of the liquid conduits 111.

In one embodiment, the liquid conduits 111, the pump 126, and/or the liquid reservoir 128 comprise a liquid source. In another embodiment, the liquid conduits 111 may be coupled to another liquid source, such as a municipal water source, a pressurized water tank, a liquid reservoir integrated with the cartridge 106, and/or another liquid source. As discussed below with regards to FIG. 3, the liquid may comprise water, a water soluble activating agent mixed with water, an aqueous substance such as hydrochloric acid (HCl), or the like.

In one embodiment, the cooling module 112 is coupled to the cartridge receiver 105. The cooling module is discussed in greater detail with regards to FIG. 4. In general, the cooling module 112 is configured to disperse the heat produced by the chemical reaction between a liquid such as water and the chemical hydride. In one embodiment, the cooling module 112 includes low power fans that provide high airflows. In a further embodiment, the electrical and control system 103 may adjust the airflow from the cooling module 112 according to the temperature of the fuel cartridge 106 as measured by the temperature sensor 118 to reduce parasitic power losses.

In another embodiment, the cooling module 112 comprises one or more blowers that are not affected by backpressure within the cartridge receiver 105. The one or more blowers may be configured to maintain a higher air pressure than an axial fan. One or 4more forms, guides, manifolds, or heat dams may be used to control and direct the flow of air around the fuel cartridge 106. In a further embodiment, the cooling module 112 may comprise a water pump configured to pump water around the cartridge 106 to facilitate a heat transfer between the cartridge and the water. The water pump may pump the water through tubing, pipes, passages, manifolds, or through channels in the cartridge receiver 105 or the cartridge 106. A heat sink comprising a metal, graphite, or other thermally conductive material may also be used.

In one embodiment, one or more hydrogen ports 114 are integrated with the alignment structures 108 on the hydrogen fuel cartridge 106. In a further embodiment, the hydrogen ports 114 are in fluid communication with one or more port connectors in the cartridge receiver 105. The hydrogen port connectors in the cartridge receiver 105 may include seals or O-rings. The hydrogen ports 114 may comprise one or more interface gas outlet ports in a cartridge interface that are configured to mate with one or more receiver gas ports in the cartridge receiver 105. The seals or O-rings may substantially circumscribe the hydrogen ports 114, to produce a seal between each of the one or more hydrogen ports 114 and the one or more receiver gas ports in the cartridge receiver 105. In another embodiment, the O-rings are configured to break the seal and release the hydrogen gas in response to a gas pressure above a predetermined safe hydrogen gas pressure. This ensures that the hydrogen generation system 101 remains a safe, low pressure system.

In one embodiment, hydrogen gas exiting the inside of the hydrogen fuel cartridge 106 passes through an activated charcoal filter 116. In one embodiment, the activated charcoal filter 116 is integrated with the hydrogen fuel cartridge 106. In this manner, the activated charcoal filter 116 is replaced when the hydrogen fuel cartridge 106 is replaced. The activated charcoal filter 116, in one embodiment is located near the top of the hydrogen fuel cartridge 106 between the hydrogen ports 114 and the liquid permeable material 108. In another embodiment, the activated charcoal filter 116 is located external to, and downstream of, the hydrogen fuel cartridge 106. The activated charcoal filter 116 is configured to remove impurities such as hydrocarbons, other organic compounds, water vapor, dissolved or solid salts, or other impurities from the generated hydrogen gas. The activated charcoal filter 116 may comprise activated carbon such as charcoal, and/or other individual filters, condensers, or coalescers comprising material suitable for filtering impurities from hydrogen gas. The activated charcoal filter 116 may also comprise a particulate filter configured to remove particles greater than a predefined size from the hydrogen gas. In one embodiment, the predefined size is about 5 microns. The activated charcoal filter 116 may be integrated with the fuel cartridge 106.

In one embodiment, the temperature sensor 118 is configured to monitor the temperature of the hydrogen fuel cartridge 106 and the cartridge receiver 105. The temperature sensor 118 may make contact with, be disposed within, or otherwise read the temperature of the cartridge receiver 105 and/or the fuel cartridge 106. The temperature that the temperature sensor 118 reads may cause the electrical and control system 103 to activate or deactivate the cooling module 112 or adjust other system variables to meet predetermined safety and usability standards.

In one embodiment, one or more cartridge sensors 120 determine the presence or absence of the hydrogen fuel cartridge 106. In a further embodiment, the cartridge sensors 120 may comprise one or more alignment sensors that determine whether the hydrogen fuel cartridge 106 is properly aligned for operation. The cartridge sensors 120 may be one or more manual switches, optical sensors, magnetic sensors, or other types of sensors capable of determining when the fuel cartridge 106 is present. Preferably, the cartridge sensors 120 are optical sensors. Optical cartridge sensors 120 are easier to position and calibrate during the manufacturing process and provide precise measurements without wearing overtime as may occur with mechanical switches. In a further embodiment, the cartridge sensors 120 are also configured to determine when the housing lid 107 is properly closed and locked. The cartridge sensors 120 may comprise multiple cartridge sensors in various positions in or around the hydrogen fuel cartridge 106, the cartridge receiver 105, and the housing lid 107.

In one embodiment, the system 100 is configured to prevent hydrogen production unless one or more system sensors determine that the system 100 is in a proper system state. The one or more system sensors may be selected from the group consisting of the temperature sensors 118, 164, the cartridge sensor 120, the hydrogen pressures sensors 132, 144, and other system state sensors. In one embodiment, the system 100 prevents hydrogen production until the housing lid 107 is detected as properly closed and locked, and the cartridge 106 is detected as present. In a further embodiment, the system 100 is configured to prevent the housing lid 107 from unlocking or opening until the temperature of the hydrogen fuel cartridge 106, as measured by the temperature sensor 118, is within a safe handling range, to prevent injury to the user. In a further embodiment, the system 100 is configured to prevent the housing lid 107 from unlocking or opening until the flow of hydrogen has dropped below a certain flow rate or the gas pressure of the hydrogen fuel cartridge 106, as measured by the pressure sensor 132, is within a safe range, to prevent risk to the user. In one embodiment, the electrical and control system 103 controls the hydrogen production based on inputs from one or more system sensors. In a further embodiment, the electrical and control system 103 controls a system controlled lock on the housing lid 107 based on inputs from the cartridge temperature sensor 118.

In one embodiment, the hydrogen fuel cartridge 106 includes an RFID tag 122 or other identifying device, such as a barcode. The RFID tag 122, barcode, or other identifying device may be embedded in, mounted on, or otherwise coupled to the hydrogen fuel cartridge 106 such that it is readable and/or writeable by the ID sensor 124 coupled to the cartridge receiver 105. In a further embodiment, the RFID tag 122 includes a unique cartridge identifier, such as an identification number. By uniquely identifying each cartridge 106, the system 100 may provide usage statistics to the user, including alerts when the cartridge 106 is low on fuel and when the cartridge 106 must be replaced, even when the cartridge 106 is removed from the system 100 prior to exhaustion and later returned to the system 100.

In one embodiment, the electrical and control system 103 may comprise a state of fill module 194 that is configured to store usage information for one or more hydrogen fuel cartridges 106 corresponding to the unique cartridge identification number associated with each hydrogen fuel cartridge 106. For example, the state of fill module 194 may comprise a memory, where the state of fill module 194 may store the usage information. In another embodiment, the RFID tag 122 comprises a memory, and is readable and writeable, and the state of fill module 194 may write usage information to the RFID tag 122, using the ID sensor 124 or the like. By storing usage information on the RFID tag, the state of fill module 194 has valid usage information, even when the cartridge 106 is used in multiple systems. The state of fill module 194 may collect usage information, including the amount of fuel remaining in the cartridge 106, by monitoring the amount of a liquid such as water injected into the cartridge 106, or by monitoring the amount of hydrogen that has exited the cartridge 106. Because the amount of reactants within the cartridge 106 is known, and the amount of reactant used with each pulse of liquid injected is known, the state of fill module 194 may use a simple chemical reaction calculation to determine an estimate of how much hydride reactant has been used, how much hydride reactant remains, and how much hydrogen gas is producible by the fuel cartridge 106. In one embodiment, the electrical and control system 103 adjusts one or more system control parameters based on the usage information that the state of fill module 194 calculates corresponding to a particular fuel cartridge 106.

In one embodiment, a liquid is pumped into the hydrogen fuel cartridge 106 through the one or more liquid conduits 111 by the pump 126. In one embodiment, the pump 126 is configured to pump the liquid in discrete pulses, according to a dynamic pulse rate or liquid injection rate that the controller 192 determines based on the hydrogen production or hydrogen pressure and the power demanded by an electric load coupled to the system 100. Pumping the liquid at variable pulse rates provides very fine control over the amount of the liquid supplied.

In one embodiment, the controller 192 employs an algorithm to determine liquid injection rate. In such an embodiment, the controller 192 receives input regarding the demand from the electric load, the demand for electricity from the system itself (also known as the balance of plant or "BOP"), the electricity output of the fuel cell 146 (or fuel cell stack), the pressure of produced hydrogen that has not yet been sent to the fuel cell 146, and the current charge level of the one or more power storage devices 168. The controller 192 then sets the liquid injection rate at a level that optimizes the use of the hydrogen that will be produced from the cartridge 106 by accommodating a production delay that is inherent generation of hydrogen from a hydride. The production delay is a time delay between when the liquid injection rate is changed and when the resulting change in the hydrogen production rate occurs. Various algorithms may be used to determine the optimal liquid injection rate.

The controller 192 may determine the total wattage desired from the fuel cell 146 for the next cycle in the future (a cycle is the time between when the controller 192 determines whether or not to make an adjustment to the liquid injection rate and potentially make such an adjustment). Next, the controller 192 determines whether the one or more power storage devices 168 are charged above, below, or at a desired charge level. Preferably, the desired charge level is less than full charge for example about 80%. With such a desired charge level, the controller 192 is capable of and may divert excess electricity from the fuel cell to the one or more power storage devices 168 and the excess electricity will not be wasted. Similarly, excess hydrogen produced due to the production delay can be converted by the fuel cell 146 into electricity rather than being wasted (i.e. the pressure exceeds a safety level and must be purged).

The controller 192 also determines whether the pressure of produced hydrogen that has not yet been sent to the fuel cell 146 is within an acceptable range. Too high of a pressure may cause safety concerns that trigger purging of the excess hydrogen by the controller 192 or other safety devices. Too little hydrogen pressure may exacerbate the production delay.

The controller 192 then defines a liquid injection rate that will increase hydrogen production such that the pressure of produced hydrogen that has not yet been sent to the fuel cell 146 will come within the acceptable range (either increasing or decreasing) and the total electric power demand, from the electric load and the BOP is met either from the fuel cell 146 or from the one or more power storage devices 168. In addition, the controller 192 may define the liquid injection rate such that electricity from the fuel cell 146 that is not needed for the electric load or BOP may be used to recharge the one or more power storage devices 168 back to the desired charge level.

In certain embodiments, the controller 192 adjusts the liquid injection rate and an electricity production rate of the fuel cell 146 in response to the inputs described above in relation to the liquid injection rate. Adjusting the electricity production rate of the fuel cell 146 may comprise increasing the flow rate of oxygen or air passing through the fuel cell 146.

In one embodiment, the controller 192 determines the pulse rate using one or more mathematical or statistical curves. In a further embodiment, the controller 192 determines the pulse rate using a hydrogen pressure curve, and an electrical power demand curve, each curve having individual slopes and magnitudes. In one embodiment, the magnitudes at varying points along the curves signify an amount of time between pulses. The magnitudes may be positive or negative, with positive values signifying a slower pulse rate, and negative values signifying a faster pulse rate. When the controller 192 uses multiple curves, the controller 192 may add the magnitudes from each curve at the point on the curve corresponding to a current system state together to determine the pulse rate.

The pump 126 is a pump capable of pumping a liquid into the fuel cartridge 106 through the one or more liquid conduits 111. In one embodiment, the pump 126 is a peristaltic pump. Use of a peristaltic pump is advantageous because a peristaltic pump cannot contaminate the liquid that it pumps, is inexpensive to manufacture, and pumps a consistent, discrete amount of liquid in each pulse. Advantageously, a peristaltic pump provides a consistent and discrete amount of liquid regardless of the backpressure in the liquid in the liquid conduits 111.

In one embodiment, the controller 192 determines the amount of hydrogen gas produced, and the potential amount of hydrogen production remaining in the fuel cartridge 106 by tracking the number of pulses made by the pump 126. The controller 192 may determine the remaining hydrogen potential of the fuel cartridge 106 based on the amount of chemical hydride originally in the fuel cartridge 106, the size of each pulse that the pump 126 pumps, and the number of pulses that the pump 126 has pumped. The controller 192 may define the pump 126 pulse quantity or liquid injection rate based on the hydrogen gas requirements of the fuel cell 146, which are based on the electric power demands of the system 100 and one or more electric loads coupled to the system 100. In one embodiment, the pump 126 pulse quantity is between about 75 µL to 100 µL. In addition, a peristaltic pump 126 allows the control system 103 to reverse the direction of the pump to withdraw the liquid from the cartridge 106 and thereby slow the production of hydrogen. This fine degree of control allows the production of hydrogen to more closely match the demands of the hydrogen consuming device 102.

The pump 126 pumps a liquid that is stored in the liquid reservoir 128. In a further embodiment, the liquid reservoir 128 is configured to store water that is recycled by the system 100. To recycle water, water is removed from the hydrogen exiting the hydrogen fuel cartridge 106 and returned to the liquid reservoir 128, as described below in relation to the water trap 134. The flow of moist air and hydrogen exiting the fuel cell stack 146 may also be pumped, guided, or forced into the liquid reservoir 128, and forced through the condenser 138 as described below. In another embodiment, a user may add liquid to the liquid reservoir 128 manually. In a further embodiment, the liquid reservoir 128 may comprise another liquid source, such as a municipal water source, a groundwater well, or the like. In another embodiment, the liquid reservoir 128 may be coupled to or integrated with the fuel cartridge 106.

In one embodiment, the liquid level detector 129 monitors a liquid or water level of the liquid reservoir 128. The liquid level detector 129 may be an ultrasonic sensor, a float sensor, a magnetic sensor, pneumatic sensor, a conductive sensor, a capacitance sensor, a point level sensor, a laser sensor, an optical sensor, or another water level sensor. In a further embodiment, the liquid level detector 129 comprises a window into the liquid reservoir 128 that allows a user to visually monitor the liquid level.

In one embodiment, the generated hydrogen passes through the check valve 130. The check valve 130 allows hydrogen to exit the cartridge 106, but prevents hydrogen from returning into the cartridge 106. The check valve 130 also prevents hydrogen from exiting the system 100 when the cartridge 106 has been removed. This conserves hydrogen, provides a safety check for the user, and allows an amount of hydrogen to be stored in the system 100 for later use. The check valve 130 is in inline fluid communication with the hydrogen ports 114. In one embodiment, a second check valve is integrated into the lid of the cartridge receiver 105, or into a receiver gas port in the cartridge receiver 105. The check valve 130 may be a silicone duckbill type valve, or a diaphragm type valve supplied by United States Plastics of Lima, Ohio.

In one embodiment, a hydrogen pressure sensor 132 downstream from the check valve 130 measures the gas pressure of the hydrogen. In a further embodiment, the hydrogen pressure sensor 132 measures the hydrogen pressure in the system upstream of the hydrogen regulator 142. The hydrogen pressure sensor 132 may be used for safety purposes and/or to monitor hydrogen generation rates. In one embodiment, controller 192 of the electrical and control system 103 may use the pressure values measured by the hydrogen pressure sensor 132 to determine a pump pulse rate for the pump 126 using a pressure curve, as described above. In general, the controller 192 may increase the pulse rate for low pressure measurements, and decrease the pulse rate for high pressure measurements. More curves, such as power demand or other curves, may also be factored into determining an optimal pulse rate. Monitoring the pressure using the pressure sensor 132 also allows the system 100 to adjust the pressure before it reaches unsafe levels. If pressure is above a predetermined safety value, the electrical and control system 103 may vent hydrogen out through the hydrogen purge valve 166 to return the system to a safe pressure.

In one embodiment, the mechanical valve 133 is positioned upstream of the hydrogen pressure regulator 142. In one embodiment, the mechanical valve 133 is a mechanical valve configured to automatically release gas pressure when the pressure is greater than a predetermined pressure. In one embodiment, the predetermined pressure associated with the mechanical valve 133 is higher than the predetermined safety value associated with the hydrogen pressure sensor 132 described above. In one embodiment, the predetermined pressure associated with the mechanical valve 133 is about 24 pounds per square inch gauged (psig), and the predetermined safety value associated with the hydrogen pressure sensor 132 is between about 25 to 30 psig or higher depending on system design requirements, such as 100 psig.

In one embodiment, one or more other system components are configured to release hydrogen pressure in the event that the hydrogen pressure regulator 142 fails. The other system components may include O-rings, hose fittings or joints, the pump 126, or other mechanical components or connections. The multiple levels of pressure release provides added safety to the user, and ensures that the system 100 remains at a safe pressure, with no danger of explosions or other damage to the system 100 or to the user. Low pressure systems are not only safer than higher pressure systems, but in general they have lower material and construction costs.

In one embodiment, the hydrogen passes through a water trap 134. The water trap 134 is configured to remove moisture from the hydrogen gas. In a further embodiment, the water trap 134 also comprises one or more particulate filters configured to filter particles from the hydrogen gas. The particulate filters may be substantially similar to the particulate filter described above. Filtering the hydrogen reduces corrosion, wear, and other damage that may be done to the fuel cell stack 158, and extends the life of the system 100. In one embodiment, the moisture removed from the water trap 134 passes through transfer valve 136 to the liquid reservoir 128. The recycled water can then be injected into the hydrogen fuel cartridge 106 as described above.

In one embodiment, the liquid reservoir 128 has a condenser 138. The condenser 138 removes water from air and other gasses that enter the liquid reservoir 128. In one embodiment, water condenses on frit or other material in the condenser. In a further embodiment, the air and other gasses exit the system through the pressure control valve 140 after passing through the condenser 138.

In one embodiment, the hydrogen passes from the water trap 134 to a hydrogen consuming device 102, such as a hydrogen fuel cell system. In further embodiments, the hydrogen consuming device 102 may comprise a microturbine system or other hydrogen combustion system, a hydrogen storage tank, or another device that consumes, stores, or otherwise uses hydrogen. In one embodiment the hydrogen consuming device 102 may comprise a hydrogen pressure regulator 142, a hydrogen pressure sensor 144, a hydrogen fuel cell stack assembly 146, one or more air filters 150, one or more air pumps 152, an air humidifier 156, a modular stack 158, a hydrogen humidifier 160, one or more cooling fans 162, a temperature sensor 164, a hydrogen purge valve 166, and one or more power storage devices 168.

In one embodiment, the hydrogen regulator 142 regulates the flow of hydrogen into the hydrogen fuel cell stack assembly 146 from the water trap 134. The hydrogen regulator 142 may cooperate with the check valve 130 to store hydrogen between the check valve 130 and the hydrogen regulator 142, even between uses of the system 100. The hydrogen regulator 142 releases a controlled amount of hydrogen into the fuel cell stack assembly 146, maintaining a predetermined gas pressure in the fuel cell 146. In one embodiment, the predetermined gas pressure in the fuel cell 146 is about 7 psi. In a further embodiment, the system 100 may comprise one or more hydrogen output regulators to control the amount of hydrogen gas that the hydrogen generation system 101 releases. The one or more hydrogen output regulators may comprise the check valve 130, the hydrogen regulator 142, and/or the controller 192, as described above.

In one embodiment, the hydrogen pressure sensor 144 measures the gas pressure of the hydrogen in the system 100 downstream of the hydrogen regulator 142. (i.e. within the hydrogen consuming device 102). The hydrogen pressure sensor 144 may be used for safety purposes, and/or to monitor hydrogen use by the fuel cell 146. If pressure is above a predetermined safety value, hydrogen may be vented from the system through the hydrogen purge valve 166 to return the pressure to a safe level. In one embodiment, if the pressure is below the predetermined fuel cell gas pressure described above, the hydrogen regulator 142 releases more hydrogen into the fuel cell stack 146.

The hydrogen fuel cell stack assembly 146 creates electric power from a flow of hydrogen and an oxygen source such as air, as is known in the art. In general, each fuel cell 158 in the hydrogen fuel cell stack assembly 146 has a proton exchange membrane (PEM), an anode, a cathode, and a catalyst. A micro-layer of the catalyst is usually coated onto carbon paper, cloth, or another gas diffusion layer, and positioned adjacent to the PEM, on both sides. The anode, the negative post of the fuel cell 158, is positioned to one side of the catalyst and PEM, and the cathode, the positive post of the fuel cell, is positioned to the other side. The hydrogen is pumped through channels in the anode, and oxygen, usually in the form of ambient air, is pumped through channels in the cathode. The catalyst facilitates a reaction causing the hydrogen gas to split into two H+ ions and two electrons. The electrons are conducted through the anode to the external circuit, and back from the external circuit to the cathode. The catalyst also facilitates a reaction causing the oxygen molecules in the air to split into two oxygen ions, each having a negative charge. This negative charge draws the H+ ions through the PEM, where two H+ ions bond with an oxygen ion and two electrons to form a water molecule.

In one embodiment, one or more air filters 150 are configured to filter air for use by the fuel cell stack assembly 146. In one embodiment, one or more air pumps 152 draw air into the system 100 through the air filters 150. The air pumps 152 may be diaphragm pumps, or other types of air pumps capable of maintaining an air pressure to match the hydrogen pressure in the fuel cell, for a maximum power density in the fuel cell stack 146. In one embodiment, the air pumps 152 are configured to increase or decrease the air flow in response to a signal from the electrical and control system 103. The electrical and control system 103 may send the activating signal in response to a determined electrical load on the system 100. Varying the air flow as a function of the electrical load reduces parasitic power losses and improves system performance at power levels below the maximum. In one embodiment, the one or more air pumps 152 have multiple air pumping capabilities configured to optimize the amount of air delivered to the fuel cell stack 146. For example, a smaller capacity air pump 152 may be activated during a low power demand state, a larger capacity air pump 152 may be activated during a medium power demand state, and both the smaller and the larger capacity air pumps 152 may be activated during a high power demand state.

In one embodiment, the air humidifier 156 humidifies the air entering the fuel cell stack 146. Adding moisture to the air keeps the PEMs in each of the fuel cells 158 moist. Partially dehydrated PEMs decrease the power density of the fuel cell stack 146. Moisture decreases the resistance for the H+ ions passing through the PEM, increasing the power density. In one embodiment, moist air exiting the fuel cell stack 146 flows past one side of a membrane within the air humidifier 156 before exiting the fuel cell stack 146, while dry air flows past the other side of the membrane as the dry air enters the fuel cell stack 146. Water is selectively drawn through the membrane from the wet side to the dry side, humidifying the air before it enters the fuel cell stack 158.

In one embodiment, the hydrogen humidifier 160 is configured to humidify the hydrogen entering the fuel cell stack 146, such that the PEM remains moist. This is useful if the fuel cell stack 146 is being run at a very high power density, or at a very high 4temperature, and the moisture already in the hydrogen is not enough to keep the PEM moist. The hydrogen humidifier 160 may be configured in a similar manner as the air humidifier 156, with hydrogen flowing into the fuel cell stack 146 on one side of a membrane within the hydrogen humidifier 160, and moist air flowing out of the fuel cell stack 146 on the other side of the membrane, the membrane selectively allowing water to pass through to humidify the hydrogen. The moist hydrogen will moisten the anode side of the PEMs, while the moist air from the air humidifier 156 will moisten the cathode side of the PEMs.

In a further embodiment, the air humidifier 156 and the hydrogen humidifier 160 may be integrated with each other and/or with the fuel cell stack 158. The air humidifier 156 and the hydrogen humidifier 160 may each comprise an input gas chamber and a water vapor chamber, with a water-selective membrane disposed between them. The air humidifier 156 and the hydrogen humidifier 160 may be integrated with structural members of the fuel cell stack assembly 146, and may be configured to have an area footprint less than or equal to the area footprint of one or more of the fuel cells in the fuel cell stack 158.

In one embodiment, the one or more cooling fans 162 prevent the fuel cell stack 158 from overheating. The electrical and control system 103 controls the operation and speed of the cooling fans 162. Separating the cooling system 162 from the fuel cell stack air supply system decreases the dehydration of the PEM since the air supply can be kept at a much lower flow than is required for cooling. A fuel cell system with separated cooling and air supply systems are referred to as closed cathode systems. In one embodiment, the cooling fans 162 are low power fans that provide high airflows. In a further embodiment, the airflow from the cooling fans 162 may be adjusted according to the temperature of the fuel cell stack 158 to reduce parasitic power losses. In another embodiment, the one or more cooling fans 162 comprise one or more blowers configured to maintain a higher air pressure than an axial fan. One or more forms, guides, ducts, baffles, manifolds, or heat dams may be used to control and direct the flow of air, or to maintain a predefined air pressure in and around the fuel cell stack 146.

In one embodiment, the temperature sensor 164 measures the temperature of the fuel cell stack 162. As described above, in one embodiment the cooling fans 162 may be activated based at least in part on the temperature that the temperature sensor 164 measures. In a further embodiment, the electrical and control system 103 is configured to shutdown the system 100 and to notify the user if the temperature sensor 164 measures a temperature higher than a predetermined unsafe temperature value.

In one embodiment, a hydrogen purge valve 166 is coupled to the fuel cell stack 146. The hydrogen purge valve 166 vents hydrogen from the fuel cell stack 146. The hydrogen purge valve 166 may be used to vent hydrogen when pressures reach unsafe levels, as measured by the hydrogen pressure sensors 132, 144 described above, or routinely to keep the fuel cells 158 in good condition by removing accumulated liquid water and impurities from the fuel cell stack 158, improving performance, and preventing corrosion of the catalyst over time. The electrical and control system 103 may send a purge signal to the hydrogen purge valve 166 when the pressure reaches an unsafe level, or when the electrical power produced by the fuel cell stack 146 is below a predefined level. In one embodiment, the hydrogen exiting the fuel cell stack 158 through the hydrogen purge valve 166 and the moist air that has exited the fuel cell stack 158 are sent to the liquid reservoir 128 and passed through the condenser 138 to recycle the water formed in the reaction in the fuel cell stack 146 for reuse.

In one embodiment, one or more power storage devices 168 are coupled electrically to the fuel cell stack 146. In one embodiment, the power storage devices 168 are rechargeable, and are trickle-charged by the fuel cell stack 146 when it is not in use or after the load has been disconnected to use up excess hydrogen produced by the system 100 during shutdown. The power storage devices 168 provide instantaneous power to the load during a startup phase for the system 100. This means that a load connected to the system 100 will have instantaneous power, and will not have to wait for the hydrogen generation system 101 to begin generating hydrogen, or for the fuel cell stack 146 to begin producing electricity before receiving power.

In one embodiment, the power storage devices 168 are configured to heat the fuel cell stack 146 in cold environments to allow rapid startup of the fuel cell stack 146. The power storage devices 168 may heat the fuel cell stack 146 using a heating coil or other heated wire, or by using another electric heating method. In one embodiment, the power storage device 168 is coupled to the fuel cell stack 146 in parallel, and acts to level the load on the fuel cell stack 146 so that the fuel cell stack 146 can operate at its most efficient power level without constantly varying its output based on the load. The power storage devices 168 will supplement the power generated by the fuel cell stack 146 during a spike in the electrical power drawn by the load.

The power storage devices 168 may be selected from a group consisting of batteries, such as sealed lead acid batteries, lithium ion (Li-ion) batteries, nickel metal hydride (NiMH) batteries, or a variety of rechargeable batteries, a capacitor, a super capacitor, and other devices capable of storing electric power. In one embodiment, power storage devices 168 are selected for use with power capacities that may be larger than are necessary to supplement the fuel cell stack 146 in order to avoid deep cycling of the power storage devices 168 and to increase the life of the power storage devices 168. In one embodiment, the power storage devices 168 comprise a capacitor coupled directly to the fuel cell stack 146 in a parallel configuration, and a battery or other power storage device coupled indirectly to the fuel cell stack 146 in parallel after a direct current (DC) to DC converter 172 or other electrical device.

In one embodiment, the electrical and control system 103 is coupled for electrical power and control signal communication with the sensors, valves, and other components of the system 100. In one embodiment, the electrical and control system 103 includes one or more voltage and current sensors 170, a DC to DC converter 172, a circuit breaker 174, a ground fault circuit interrupter (GFCI) device 176, an electronic switch 178, a DC outlet 180, an alternating current (AC) inverter 181, an AC outlet 182, a circuit breaker switch 184, a GFCI switch 186, a display 188, a keypad 190, a controller 192, a computer communication interface 194, and a control bus 196.

In one embodiment, the voltage and current sensors 170 are configured to measure one or more of the voltages and the currents at both poles of the power storage device 168. The electrical and control system 103 may use the measured voltages and currents to determine the charge level of the power storage device 168. Based on the measurements of the voltage and current sensors 170, the electrical and control system 103 may determine whether to charge the power storage device 168 or draw on the power storage device 168 to supplement or proxy for the fuel cell stack 146. In one embodiment, the electrical and control system 103 also provides the power status of the battery to the user.

In one embodiment, the DC to DC converter 172 is configured to convert the variable voltage of the fuel cell stack 146 circuit to a substantially constant voltage. In one embodiment, the substantially constant voltage is a standard voltage, such as 5 Volts, 9 Volts, 12 Volts, 14 Volts, 24 Volts and the like. In one embodiment, the DC to DC converter 132 is a switching converter, such as a buck, boost, buck-boost, inverting, forward, flyback, push-pull, half bridge, full bridge, Cuk, or SEPIC DC to DC converter. In a further embodiment, the DC to DC converter 132 comprises a voltage regulator. In general, use of a switching DC to DC converter results in less power loss than a voltage regulator DC to DC converter. The DC to DC converter 172 may provide electric power to the electrical components of the system 100 and to an electric load that is coupled to the system 100.

In one embodiment, the circuit breaker 174 interrupts the electric circuit in response to an electrical overload or an electrical short in the circuit. An overload in the circuit may occur if the electric load requires more current than the system 100 can provide. In one embodiment, the rating of the circuit breaker 174 is determined by the electric power generating capabilities of the system 100. In one embodiment, the circuit breaker 174 is a standard rated circuit breaker rated for the current level of the electrical and control system 103. In one embodiment, the circuit breaker switch 184 is configured to reset the circuit breaker 174 after the circuit breaker 174 interrupts the circuit.

In one embodiment, the GFCI device 176 interrupts the electric circuit in response to an electrical leak in the circuit. The GFCI device 176 can interrupt the electric circuit more quickly than the circuit breaker 174. The GFCI device 176 is configured to detect a difference in the amount of current entering the circuit and the amount of current exiting the circuit, indicating an electrical current leak, or a separate path to ground. In one embodiment, the GFCI device 176 is able to sense a current mismatch as small as 4 or 5 milliamps, and can react as quickly as one-thirtieth of a second to the current mismatch. In one embodiment, the GFCI switch 186 is configured to reset the GFCI device 176 after the GFCI device 176 interrupts the circuit.

In one embodiment, electronic switch 178 disconnects the load from electric power, without disconnecting the rest of the circuit. In one embodiment, the electronic switch 178 disconnects the load after a user initiated a power down phase of the system. During a shutdown state, the system 100 may activate the electronic switch 178 and disconnect the load continue to generate electricity to charge the power storage device 168 and to use excess hydrogen.

In one embodiment, the DC outlet 180 provides an outlet or plug interface for supplying DC power to DC devices. In one embodiment, the DC power has a standard DC voltage. In one embodiment, the standard DC voltage is about 9 to 15 Volts DC. In a further embodiment, the DC outlet 180 is a "cigarette lighter" type plug, similar to the DC outlets found in many automobiles.

In one embodiment, the AC inverter 181 converts DC power from the DC to DC converter 176 to AC power. In one embodiment, the AC inverter 181 converts the DC power to AC power having a standard AC voltage. The standard AC voltage may be chosen based on region, or the intended use of the system 100. In one embodiment, the standard AC voltage is about 110 to 120 Volts. In another embodiment, the standard AC voltage is about 220 to 240 Volts. In one embodiment, the AC inverter 181 converts the DC power to AC u E; g power having a standard frequency, such as 50 Hz or 60 Hz. The standard frequency may also be selected based on region, or by intended use, such as 16.7 Hz or 400 Hz.

In one embodiment, the AC outlet 182 provides an outlet or plug interface for supplying AC power from the AC inverter 181 to AC devices. In one embodiment, the AC outlet 182 is configured as a standard AC outlet according to a geographical region.

In one embodiment, the display 188 is configured to communicate information to a user. The display 188 may be a liquid crystal display (LCD), a light emitting diode (LED) display, a cathode ray tube (CRT) display, or another display means capable of signaling a user. In one embodiment, the display 188 is configured to communicate error messages to a user. In a further embodiment, the display 188 is configured to communicate the amount of power stored by the power storage device 168 to a user. In another embodiment, the display 188 is configured to communicate the usage status of the hydrogen fuel cartridge 106 to a user.

In one embodiment, the keypad 190 is configured to receive input from a user. In one embodiment, the user is a technician, and the keypad 190 is configured to facilitate system error diagnosis or troubleshooting by the technician. The input may be configured to signal the system 100 to begin a start up or shut down phase, to navigate messages, options, or menus displayed on the display 188, to signal the selection of a menu item by the user, or to communicate error, troubleshooting, or other information to the system 100. The keypad 190 may comprise one or more keys, numeric keypad, buttons, click-wheels, or the like.

In one embodiment, the controller 192 is configured to control one or more components of the system 100. The controller 192 may be an integrated circuit such as a microprocessor, an application specific integrated circuit (ASIC), a field programmable gate array (FPGA), an embedded controller, or the like and related control circuitry. The controller 192 communicates with the hydrogen pressure sensor 132, the temperature sensor 118, the RFID sensor 124, the optical sensor 120, the pump 126, the level detector 129, the air pump 152, the hydrogen pressure sensor 144, the electrical sensors 170, the temperature sensor 164, the display 188, the keypad 190, and/or other components.

In one embodiment, the controller 192 uses a control bus 196 to communicate with the components. The control bus may be one or more wires, or another communications medium providing control commands and data in series or parallel. The controller 192 may communicate on the bus using digital or analog communications. The controller 192 may monitor and optimize system efficiency and system safety, as discussed above. In one embodiment, the control bus 196 may comprise a serial peripheral interface (SPI) bus.

In one embodiment, the controller 192 balances the supply of electric power delivered to the electric load between the electric power generated by the fuel cell stack 158 and the electric power stored by the electric power storage devices 168. The controller 192 may balance the supply of electric power based on the communication signals that the controller 192 receives on the control bus 196, as described above, the electric power demands of an electric load, and/or one or more mathematical or statistical curves. In one embodiment, the controller 192 actively monitors the electric state of the power storage devices 168, the fuel cell stack 158, and the electric power demands of the electric load. The controller 192 may increase the electric power output of the power storage devices 168 in response to an electric power demand by the electric load that is higher than the electric power output of the fuel cell stack 158, and may charge the power storage devices 168 with excess power from the from the fuel cell stack 158 in response to an electric power demand by the electric load that is lower than the electric power output of the fuel cell stack. As described above with regards to the power storage devices 168, this increases the efficiency of the system 100, decreases wasted electric power, and provides a buffer for the fuel cell stack 158 such that the fuel cell stack 158 does not constantly vary its output based on the demands of the electric load.

The controller 192 may balance the supply of electric power actively or passively. For example, the fuel cell stack 158 and the power storage devices 168 may be electrically coupled in a parallel configuration, such that the controller 192 passively balances the electric power delivered to the electric load between them. The controller 192 may balance the electric power by draining the power storage devices 168 under high loads and during hydrogen production delays, and charging the power storage devices 168 under low loads.

In another embodiment, the controller 192 may use device switching to balance the electric power delivered to the electric load based on the communication signals that the controller 192 receives on the control bus 196. The controller 192 may balance the electric power by sending control signals to one or more switches coupled electrically to the subsystems described above, such as the cartridge cooling system 112, the one or more liquid pumps 126, the one or more air pumps 152, the fuel cell cooling system 162, and the like. For example, the controller 192 may adjust the output of the air pumps 152 to increase or decrease electrical output of the fuel cell stack 158, in response to an increased electric power demands, or safety reasons such as a temperature reading from the fuel cell temperature sensor 164. In one embodiment, the control signals are pulse width modulated (PWM) signals, and the switches are PWM controlled metal oxide semiconductor field effect transistors (MOSFETs). In addition to balancing the electric power output between the fuel cell stack 158 and the one or more power storage devices 168, the controller 192 may increase or decrease hydrogen output by the hydrogen generation system 101 by calculating a liquid injection rate based on the power demands of the electric load or based on a hydrogen pressure reading by the hydrogen pressure sensor 132, as described above with regards to the one or more liquid pumps 126.

In one embodiment, the controller 192 may store one or more system status messages, performance data, or statistics in a log that may be accessed by a user using the display 190 or the computer communication interface 194. In one embodiment, the controller 192 and other circuitry are positioned to prevent shorts and fire due to water within the outer housing 104. For example, in one embodiment, the controller 192 and other circuitry are position towards the top of the system 100.

In one embodiment, the computer communication interface 194 is configured to interface the controller 192 with a computer. The computer communication interface 194 may comprise one or more ports, terminals, adapters, sockets, or plugs, such as a serial port, an Ethernet port, a universal serial bus (USB) port, or other communication port. In one embodiment, a computer may use the computer communication interface 194 to access system logs, performance data, system status, to change system settings, or to program the controller 192.

In one embodiment, the outer housing 104 is configured to enclose and protect the system 100. The outer housing 104 comprises a durable material such as metal, plastic, and the like. In one embodiment, the outer housing 104 is a lightweight material to increase the portability of the system 100. In a further embodiment, the outer housing 104 has a hole or a window to facilitate monitoring of the liquid level in the liquid reservoir 128 by the user. In a further embodiment, the housing 104 is further configured to provide electronic frequency shielding to components of the electric and control system 103.

FIGS. 2A and 2B illustrate embodiments of a hydrogen fuel cartridge 200 that is substantially similar to the hydrogen fuel cartridge 106 of FIG. 1. The fuel cartridge 200a,ba,b may include a tubular body or housing 202a,b. In one embodiment, the housing 202a,b is sized to be portable, and may range from about 1 to 5 inches in diameter and from about 4 to 12 inches in length. In a further embodiment, the housing 202a,b is much larger, and is configured for installation in a building, vehicle, or other non-portable application. The housing 202a,b is not limited to any particular cross-sectional shape or any particular dimensions, but may have a circular cross-sectional shape.

In one embodiment, the housing 202a,b is formed of a material such as aluminum which has sufficient strength, is comparatively light, and has good heat transfer characteristics. However, many substitute materials will be readily apparent to those skilled in the art, including steel, stainless steel, copper, carbon fiber epoxy composites, fiberglass epoxy composites, PEEK, polysulfone derivatives, polypropylene, PVC, or other suitable materials. In one embodiment, the fuel cartridge 200a,b also has a top end cap 204a,b allowing the fuel cartridge 200a,b to be easily positioned and locked into place with other components of the overall hydrogen generation system 100 as described above.

In one embodiment, the top end cap 204a,b comprises an alignment structure 208a,b, one or more hydrogen ports 212a,b, and one or more water ports 216a,b. In one embodiment, the hydrogen ports 212a,b and the water ports 216a,b may also comprise one or more self sealing devices know to the art. The alignment structure 208a,b or other locking feature is configured to ensure that the top end cap 204a,b can only engage the cartridge receiver 105 in one orientation. In one embodiment, the housing 202a,b includes a crimp 224a,b, substantially circumscribing the housing 202a,b near the open end of the housing 202a,b. The crimp 224a,b secures the housing 202a,b to the top end cap 204a,b. In addition, the crimp 224a,b is configured to release internal hydrogen gas and water in response to a dangerously high gas pressure build up within the housing 202a,b. In further embodiments, other securing methods such as threading, glue or other adhesives, welding, or the like may secure the top end cap 204a,b to the housing 202a,b.

In one embodiment, the one or more hydrogen ports 212a,b and the one or more water ports 216a,b are substantially similar to the one or more hydrogen ports 114 and the one or more water ports 111 described above. In one embodiment, the hydrogen ports 212a,b and the water ports 216a,b are about one sixteenth of an inch. In one embodiment, one or more fluid injection tubes 218a,b extend into the interior of the cartridge receiver 202a,b which holds a solid reactant (as explained in more detail below) from the one or more water ports 216a,b. In one embodiment, the injection tubes 218a,b may extend into the housing 202a,b at least half of the length of the housing 202a,b, in other embodiments the injection tubes 218a,b may extend less than half the housing's length. In one embodiment, the water injection tubes 218a,b have an inside diameter of about 1 mm. In a further embodiment, the water injection tubes 218a,b have an inside diameter ranging from about 0.5 to 5.0 mm.

The injection tubes 218a,b may be made of aluminum, brass, or other metal, PTFE, Nylon®, or other high temperature polymers. In one embodiment, a series of liquid distribution apertures will be formed along the length of the water injection tubes 218a,b. In another embodiment, the cartridge 200a,b is oriented vertically, and the injection tubes 218a,b are configured to extend substantially to the base of the cartridge 200a,b, such that water successively fills the cartridge 200a,b from the base towards the top end cap 204a,b. In this manner the water may also be pumped out of the cartridge 200a,b through the injection tubes 218a,b to further control hydrogen production and to maintain a safe hydrogen pressure.

Figure 3A:
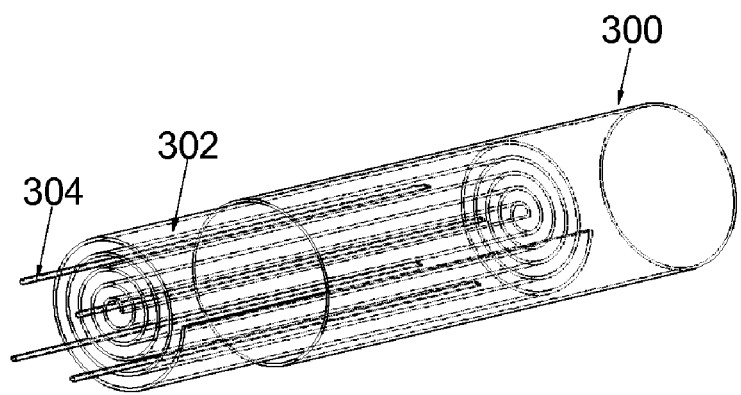
FIG. 3A is a schematic block diagram illustrating a further embodiment of a hydrogen fuel cartridge in accordance with the present invention.
Figure 3B:
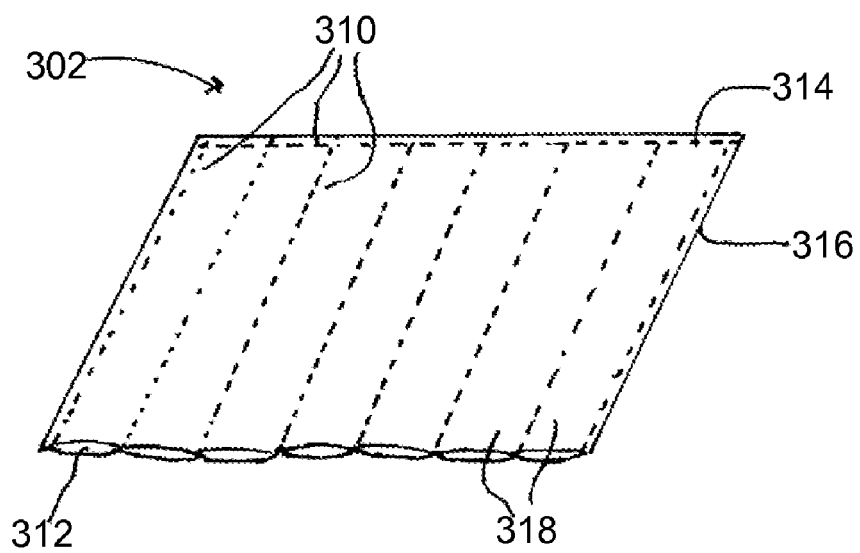
FIG. 3B is a schematic block diagram illustrating one embodiment of a liquid permeable material in accordance with the present invention.

FIG. 3A illustrates a further embodiment of a fuel cartridge 300. As described above, in one embodiment, the fuel cartridge 300 comprises a solid reactant such as a solid anhydrous chemical hydride. In one embodiment, a chemical hydride may be considered a reducing compound containing a metal and hydrogen that generates hydrogen gas when it reacts with water or other oxidizing agents.

In one embodiment of the present invention, the chemical hydride reactant utilized in the fuel cartridge 300 may be a dry, powdered form of sodium borohydride ($NaBH_4$) mixed with a dry activating agent. The $NaBH_4$ is particularly suitable for use in the pouch 302 seen in FIG. 3B and in one embodiment, the $NaBH_4$ will have a grain size ranging from about mesh 10 to about mesh 1000. In a preferred embodiment, the activating agent is an anhydrous, powdered solid when mixed with $NaBH_4$, since solids tend to react very slowly with each other. However, in alternative embodiments, the activating agent could also be mixed into an organic/oil solvent. In addition, the activating agent in certain embodiments is preferably water soluble to increase its effectiveness, since the greater its solubility, the greater its potential to activate the water/$NaBH_4$ reaction.

One effective activating material is magnesium chloride ($MgCl_2$), since it is relatively lightweight, low cost, and strongly activating. Other potential activating agents are other salts of Group IIA (alkaline earth metals), or Group IIIA with Group VIIA (halides), such as $AlCl_3$, $BeF_2$, $BeCl_2$, $BeBr_2$, $BeI_2$, $MgF_2$, $MgBr_2$, $Mg_2I$, $CaF_2$, $CaCl_2$, $CaBr_2$, and $CaI_2$. The fluorides and chlorides are preferred because they have a lower molecular weight. However, some of these salts may be less preferred depending on their degree of solubility in water or if they are considered toxic (e.g., beryllium compounds).

Activating agents may also include other water soluble salts such as Group IA (alkali metals) salts including LiF, LiCl, LiBr, LiI, NaF, NaCl, NaBr, NaI, KF, KCl, KBr, and KI. Group IA and Group IIA hydroxides may be less preferred, since they make basic solutions in water and thus reduce the reaction rate. Group IA and Group IIA oxides may also be less preferred since they tend to be more stable and thus not as reactive. However, Group IA and Group IIA sulfides, sulfates, and selenides, such as $Li_2S$, $Li_2Se$, $Mg(SO_4)_2$ may be better activating agents if they are sufficiently water soluble. In one preferred embodiment, the activating agents will be from the group of $MgCl_2$, $BeCl_2$, LiCl, NaCl, or KCl. However, any of the above activating agents may be employed given the proper design and use conditions. In certain embodiments, the activating agent will have a grain size ranging from about mesh 10 to about mesh 1000.

In one preferred embodiment, the quantity of activating agent mixed with the chemical hydride will be from about 10 weight percent to about 65 weight percent and more preferably about 50 weight percent to about 60 weight percent. In one embodiment, the quantity of activating agent is 55 weight percent. In the embodiment where the solid reactant is 55 weight percent $MgCl_2$, approximately 0.8 gm of water will be required to fully react each gm of solid reactant. One consideration in optimizing the amount of activating agent is determining the minimum amount of the material which gives the desired hydrogen generation rate and results in complete reaction/utilization of the $NaBH_4$. For a 55 weight % $MgCl_2$/$NaBH_4$ mixture, the energy density is 3116 Whr/kg. For comparison, the energy density of a 20 weight % $NaBH_4$/$H_2O$ mixture (i.e., $NaBH_4$ dissolved in water) is 1066 Whr/kg, while the energy density for $NaBH_4$ alone is 7101 Whr/kg.

An alternative activating agent maybe an anhydrous or powdered acid such as boric acid ($H_3BO_3$), oxalic acid, tartaric acid, citric acid, etc. Such anhydrous acids can be mixed with the $NaBH_4$ without reaction, but when water is added, the anhydrous acid dissolves and thus causes a reaction. Weak or relatively insoluble anhydrous acids such as boric acid when mixed with $NaBH_4$ produce hydrogen in the presence of water at a relatively low rate, and thus are less preferred. Strong acids such as oxalic acid are very soluble in water and generate substantial hydrogen when mixed with $NaBH_4$. However, this mixture is difficult to control and is also less preferred. However, intermediate strength acids, such as tartaric acid or citric acid are more favorable. In one preferred embodiment, the strength (Ka) of the dry acid will range from about $1\times10^{-4}$ to about $1\times10^{-11}$. In certain embodiments, the powdered acid will have a grain size ranging from about mesh 10 to about mesh 1000. In one preferred embodiment, the quantity of tartaric acid mixed with $NaBH_4$ will be from about 5 to about 50 weight percent and more preferably about 8 to about 12 weight percent. In this embodiment, approximately 0.8 gm of water will be required to fully react each gram of solid reactant.

As a further alternative, an inexpensive, water-insoluble catalyst may be mixed with the $NaBH_4$. The catalyst can act to accelerate the water/$NaBH_4$ reaction as water is injected. Such metal catalyst could include Co, Ni, Cu, Pt, Pd, Fe, Ru, Mn, and Cr. Typically, the metal catalyst will be in a powder form (e.g., particles less than 25 um) and will be added to the chemical hydride in an amount of about 25 weight percent to about 65 weight percent. In this embodiment, approximately 0.8 gm of water will be required to fully react each gram of solid reactant.

A still further alternative to mixing an anhydrous activating agent with the $NaBH_4$ may be to mix the water soluble activating agent in with the water before it is injected into the cartridge containing anhydrous $NaBH_4$ or other metal hydride. This has the advantage that an aqueous substance such as hydrochloric acid (HCl) may be used as the liquid described above. In this embodiment, the activating material is held in separate container or liquid reservoir such as the liquid reservoir 128 of FIG. 1. This container may be attached to the cartridge housing 300, or could be detached in other embodiments.

Although $NaBH_4$ is mainly discussed above, alternative chemical hydrides may include (but are not limited to) lithium borohydride, lithium aluminum hydride, lithium hydride, sodium hydride, and calcium hydride. In certain embodiments, these latter chemical hydrides need not be combined with a powdered activating agent as described above and may be activated with water alone.

In one embodiment, the chemical hydride reactant is enclosed within a liquid permeable material, or fabric pouch 302. As used herein, "fabric" includes not only textile materials, but also includes paper based porous materials that may be used for filtration purposes. One embodiment of the fabric comprises a porous material which can maintain structural integrity at temperatures ranging from about −20° C. to about 200° C., and a pH ranging from about 4 to about 14.

Suitable fabrics may include but are not limited to woven or nonwoven Nylon, Rayon, polyester, porous filter paper, or blends of these materials. In one embodiment, the material for the pouch 302 may be selected for optimal thickness, density, and water retention. In one embodiment, the cartridge 300 is in a vertical configuration and the pouch 302 comprises a material with minimal water retention, such that the weight of the water retained is less than about 10 times the weight of the material itself. The material also includes little or no wicking capabilities. In a further embodiment, the cartridge 300 is in a horizontal configuration and a material 302 is selected with a greater water retention ability and some wicking ability.

The water retention and wicking potential of the pouch 302 affect where the chemical reaction between the water and the chemical hydride occurs. Low water retention and wicking potential helps keep the chemical reaction at or below the water fill level in the cartridge 300. If the water retention and wicking potential are higher, the pouch 302 wicks and retains the water such that the chemical reaction can occur above the fill level of the cartridge 300. Selection of a material for the pouch 302 may be based on the configuration of the cartridge 300, the injection tubes 304, and the chemical hydride and activating agent in use, in order to more precisely control the chemical reaction within the cartridge 300.

Other relevant factors may include water permeability, porosity, chemical reactivity, and temperature stability between about 150° C. and about 250° C. relative to the chemical hydride, activating agent, and water injection system 304 in use. A suitable thickness for the material for the pouch 302 is between about 0.002 inches and 0.01 inches. A suitable density is less than about 0.05 grams per square inch.

In one exemplary embodiment, the pouch 302 comprises Crane® 57-30, a product of Crane Nonwovens of Dalton, Mass. Crane® 57-30 has a thickness of about 0.0043 inches, has a density of about 57.9 grams per square meter, is water permeable, has a pore size below about 0.0025 inches, is chemically resistant in basic and acidic solutions of about pH 4 to about pH 13, is stable in temperatures up to about 180° C., and retains only about 4 times its own weight in water. Other combinations of material properties such as thickness, density, and water retention that are configured for stable hydrogen generation may also be used.

In one embodiment, the fabric pouch 302 is comparatively thin having a substantially greater area than thickness. The pouch 302 may be formed in any conventional manner. For example, viewing FIG. 3B, it can be seen how two rectangular sheets of fabric material 314 and 316 may be sealed along three edges (for example by stitching 310 or other sealing methods) and segmented into 0.25 to 2 inch sections 318 (also by stitching) to leave open ends 312. The series of sections 318 thus formed are filled with a fine grain chemical hydride, as described above, and sealed along the fourth edge by stitching closed open ends 312.

An illustrative thickness of the pouch 302 (i.e., the thickness of sections 318 when unrolled and charged with a chemical hydride) may be approximately ¼ of an inch in one embodiment and its unrolled dimensions could be approximately 5.75 inches by 20 inches. Then the pouch 302 is rolled to a diameter sufficiently small to be inserted into tubular housing 300 as suggested in FIG. 3A (the top end cap 206 has been removed for purposes of clarity). The thickness of the pouch 302 and the unrolled dimensions may be determined based on the size of the cartridge 300, and the configuration of the pouch 302. The water injection tubes 304 are then carefully inserted between overlapping layers of the rolled pouch 302. In one embodiment, a liner (not shown) is also disposed within the housing 300 to protect the housing 300 from corrosion and damage. The liner may be removable or permanent, and may serve to extend the life of the housing 300. In one embodiment, the liner is a bag or pouch consisting of a plastic or other inert material known in the art, and the liner is configured to withstand the temperatures associated with a hydrogen generating chemical reaction, and to protect the cartridge 300 from corrosion.

The rolled pouch 302 may be rolled such that a longitudinal axis of the rolled pouch 302 is oriented coaxial with a longitudinal axis of the housing 300, as depicted. In another embodiment, the rolled pouch 302 may comprise multiple rolled pouches having varying lengths and arranged in courses. As used herein, the term "course" refers to a row or column of stacked rolled pouches 302 or single pouches 302. The varying lengths function to offset course gaps between rolled pouches in the same course. Offsetting the course gaps ensures that hydrogen production will be consistent while the pouches are being submerged during operation as the fill level of liquid reactant rises. For example, if the course gaps were aligned, when the fill level reached the course gap, hydrogen production would slow until the subsequent row of stacked pouches began to be submerged.

Figure 4A:
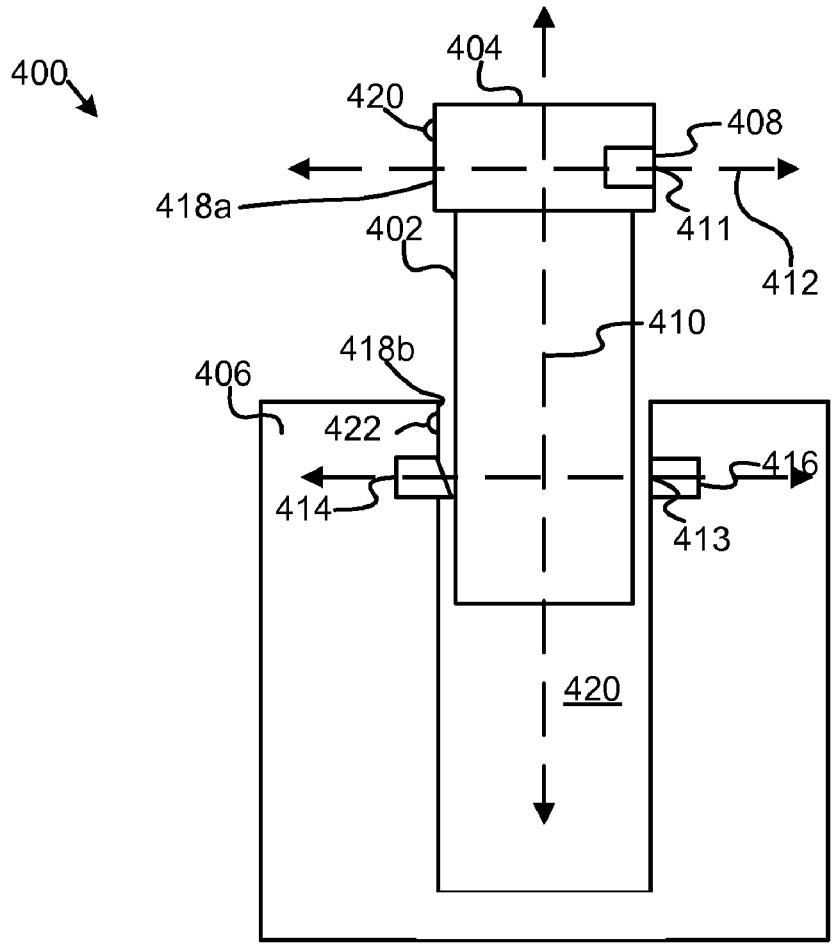
FIG. 4A is a schematic block diagram of one embodiment of a hydrogen generation system interface in accordance with the present invention.

FIG. 4A illustrates a schematic block diagram of one embodiment of a hydrogen generation system interface 400 according to the present invention. The hydrogen generation system interface 400 includes a fuel cartridge 402, a cartridge interface 404, and a fuel cartridge receiver 406. The hydrogen generation system interface 400 provides a fluid pathway for a flow of hydrogen generated by a hydrogen generation system.

The fuel cartridge 402, in one embodiment, contains a hydride fuel. In certain embodiments, the fuel cartridge 402 is configured to house a chemical hydride fuel and an activating agent, to receive water, to house a chemical reaction between the chemical hydride and the water which produces hydrogen gas, and to release the hydrogen. In one embodiment, the fuel cartridge 402 is cylindrical in shape. The cylindrical shape provides structural strength to withstand the internal pressures as hydrogen is produced. The fuel cartridge 402 may comprise a material configured to withstand the heat and pressure of the chemical reaction. The material may also comprise a lightweight material selected to minimize the weight of the fuel cartridge 402, such as a lightweight metal or metal alloy like aluminum, a plastic polymer, or other durable material. In another embodiment, the fuel cartridge 402 comprises a stamped aluminum cylindrical cartridge.

The fuel cartridge 402, in one embodiment, passes generated hydrogen to the cartridge interface 404. The fuel cartridge 402 may include passages for the transfer of generated hydrogen, such as tubes, manifolds, channels, or the like. In one embodiment, the fuel cartridge 402 includes a machined channel providing fluid communication between the interior of the fuel cartridge 402 and the cartridge interface 404. In another embodiment, the fuel cartridge 402 includes a formed channel providing fluid communication between the interior of the fuel cartridge 402 and the cartridge interface 404, such as in an injection molding process.

The cartridge interface 404, in one embodiment, is attached to the fuel cartridge 402 and includes at least one cartridge interface gas outlet port 408. In one embodiment, the cartridge interface 404 comprises an end cap, as described above with regards to the end cap 204 of FIGS. 2A and 2B. The cartridge interface 404, in one embodiment, removably couples the fuel cartridge 402 to the fuel cartridge receiver 406. In certain embodiments, the cartridge interface 404 engages the fuel cartridge receiver 406 in response to the insertion of the fuel cartridge 402 in to a cavity 420 of the fuel cartridge receiver 406. Insertion and removal of the fuel cartridge 402 occurs along an insertion path 410, the insertion path 410 represented by the dashed arrow in FIG. 4.

The cartridge interface gas outlet port 408, in one embodiment, is in fluid communication with the interior of the fuel cartridge 402 and provides a fluid pathway for a flow of hydrogen gas generated within the fuel cartridge 402. The cartridge interface gas outlet port 408 is oriented with an orientation angle 411 relative to an orthogonal plane 412. The orthogonal plane 412 is orthogonal to the insertion path 410.

In the illustrated embodiment, the interface gas outlet port 408 is oriented with an orientation angle 411 of about three degrees, meaning that the interface gas outlet port 408 orientation is three degrees from the plane of the orthogonal plane 412. In another embodiment, the interface gas outlet port 408 may have a different orientation angle 411, such as five degrees from the plane of the orthogonal plane 412. In certain embodiments, the interface gas outlet port 408 may have any orientation angle 411 from zero to 90 degrees in any direction from the orthogonal plane 412. In another embodiment, the interface gas outlet port 408 may have any orientation angle 411 from zero to 45 degrees in any direction from the orthogonal plane 412.

The cartridge interface 404 may comprise any material known in the art to withstand the pressures, temperatures, and stresses generated in hydrogen generation. In a further embodiment, the cartridge interface 404 also comprises a lightweight material, to keep the overall weight of the system to a minimum for added portability. In one embodiment, the cartridge interface 404 is a lightweight metal or metal alloy such as aluminum or the like. In a further embodiment, the cartridge housing 105 comprises a fiberglass material, a plastic polymer material, a ceramic material, or another durable material.

In certain embodiments, the cartridge interface 404 is attached to the fuel cartridge 402. In another embodiment, the cartridge interface 404 is formed as an integrated part of the fuel cartridge 402. In one embodiment, the cartridge interface 404 and the fuel cartridge 402 comprise a single structure.

The fuel cartridge receiver 406, in one embodiment, receives the fuel cartridge 402. The fuel cartridge receiver 406 may be configured to interface with the cartridge interface 404 to receive a flow of hydrogen gas. In one embodiment, the fuel cartridge receiver 406 includes a biasing member 414 and a receiver gas port 416.

The biasing member 414, in one embodiment, applies a force that acts to hold together the interface gas outlet port 408 and the receiver gas port 416. In one embodiment, the biasing member 414 compresses in response to the insertion of the fuel cartridge 402 into the fuel cartridge receiver 406.

The biasing member 414 may comprise a compliant material, a spring, or the like. For example, the biasing member 414 may comprise a synthetic or natural rubber compound that compresses upon insertion of the fuel cartridge 402 into the fuel cartridge receiver 406. In another example, the biasing member 414 may comprise an interior wall of the fuel cartridge receiver 406 which elastically deforms upon insertion of the fuel cartridge 402, applying a resulting force to the fuel cartridge interface 404. The interior wall may be tapered.

In one embodiment, the biasing member 414 is diametrically opposed to the receiver gas port 416. For example, the fuel cartridge 402 may have a circular cross section, and the fuel cartridge receiver 406 may have a corresponding substantially circular cross section. In this example, the biasing member 414 and the receiver gas port 416 may be along a common diameter of the substantially circular cross section of the fuel cartridge receiver 406.

In another embodiment, the fuel cartridge 402 and the fuel cartridge receiver 406 may have a non-circular cross section. In this embodiment, a biasing member 414 diametrically opposed to the receiver gas port 416 applies a force substantially in line with the receiver gas port 416. For example, a fuel cartridge receiver 406 with a substantially square cross section may have a biasing member 414 on a first side of the square cross section and a receiver gas port 416 diametrically opposed on the opposite side of the square cross section.

Preferably, the biasing force created by the biasing member is such that a friction fit is created between the fuel cartridge receiver 406 and the interface 406. In one embodiment, this friction fit is strong enough to retain the fuel cartridge 402 in fuel cartridge receiver 406 when the fuel cartridge receiver 406 is jarred, bumped, or turned upside down. In certain embodiments the facing walls 418*a*, 418*b* include additional biasing members or catches such as one or more nubs 420 and corresponding recesses 422 on opposites sides of the facing walls 418*a*, 418*b*.

In certain embodiments, the biasing member 414 may comprise another port in the fuel cartridge receiver 406 that corresponds to a port on the cartridge interface 404. For example, the biasing member 414 may comprise a receiver water inlet port that allows water to flow into an interface water inlet port. The receiver water inlet port may include a compliant element that compresses upon insertion of the fuel cartridge 402, for example, a rubber O ring. The compressed compliant element may generate the biasing force that holds the interface gas outlet port 408 to the receiver gas inlet port 416.

The receiver gas port 416, in one embodiment, receives the flow of hydrogen gas from the interface gas outlet port 408. The receiver gas port 416 is configured to couple with the interface gas outlet port 408. In one embodiment, the receiver gas port 416 is coupled to the interface gas outlet port 408 under a force generated by a biasing member 414, as described above.

In one embodiment, the receiver gas port 416 is oriented in an orientation angle 413 relative to a plane orthogonal to the insertion path 410 of the fuel cartridge 402. In certain embodiments, the orientation angle 413 of the receiver gas port 416 is such that the receiver gas port 416 aligns with the interface gas outlet port 408. In certain embodiments, the orientation angle 413 of the receiver gas port 416 is substantially the same as the orientation angle 411 of the interface gas outlet port 408. In the embodiment illustrated in FIG. 4, the receiver gas port 416 and the interface gas outlet port 408 have an orientation angle 411, 413 of between about zero and about five degrees. In another embodiment, the receiver gas port 416 may have an orientation angle 413 from zero to 90 degrees in any direction from the orthogonal plane 412. In another embodiment, the receiver gas port 416 may have any orientation angle 413 from zero to 45 degrees in any direction from the orthogonal plane 412.

In certain embodiments, the interface gas outlet port 408 sweeps across the receiver gas port 416 as the fuel cartridge 402 is inserted along the insertion path 410 into the fuel cartridge receiver 406. In other words, the interface gas outlet port 408 and the receiver gas port 416 are configured to interfere with each other and slide against each other as the fuel cartridge 402 is inserted into the fuel cartridge receiver 406. As the interface gas outlet port 408 sweeps across the receiver gas port 416, contaminants disposed on the interface gas outlet port 408 and/or the receiver gas port 416 are dislodged from the interface gas outlet port 408 and/or the receiver gas port 416, providing a self-cleaning interface between interface gas outlet port 408 and the receiver gas port 416.

For example, the interface gas outlet port 408 and the receiver gas port 416 may have orientation angles of about three degrees. In this example, the interface gas outlet port 408 and/or the receiver gas port 416 may sweep across one another as the fuel cartridge 402 is inserted into the fuel cartridge receiver 406. Contaminants such as dirt particles disposed on the interface gas outlet port 408 and/or the receiver gas port 416 that protrude beyond the interface gas outlet port 408 and/or the receiver gas port 416 will be perturbed by the sweeping action, and will be dislodged.

Figure 4B:
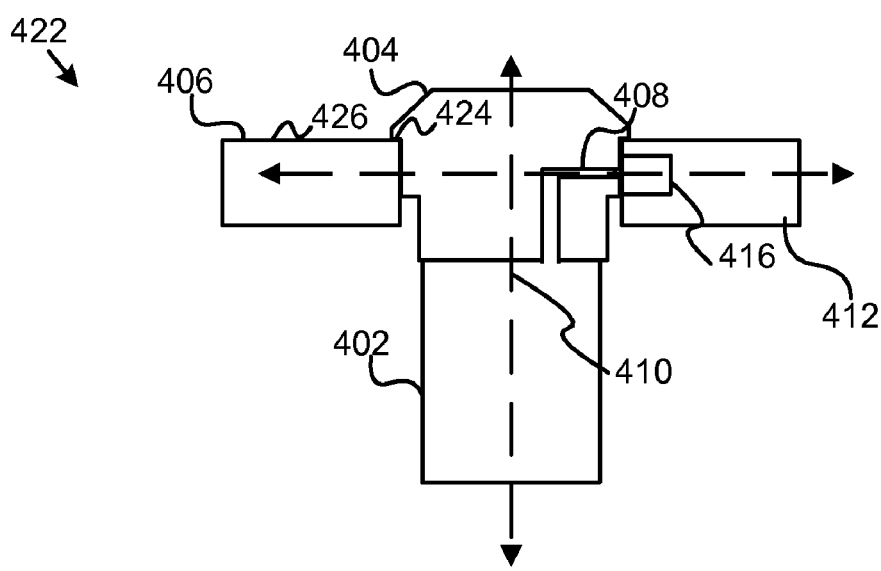
FIG. 4B is a schematic block diagram of one embodiment of a hydrogen generation system interface in accordance with the present invention.

FIG. 4B illustrates a schematic block diagram of an alternate embodiment of a hydrogen generation system interface 422 according to the present invention. The hydrogen generation system interface 422 includes a fuel cartridge 402, a cartridge interface 404, and a fuel cartridge receiver 406. The hydrogen generation system interface 400 provides a fluid pathway for a flow of hydrogen generated by a hydrogen generation system. The fuel cartridge 402, cartridge interface 404, and fuel cartridge receiver 406 are preferably configured in a like manner to similarly numbered components described in relation to FIG. 4A.

The cartridge interface 404, in one embodiment, includes a shoulder 424. The shoulder 424 may be configured to align the fuel cartridge 402 relative to the fuel cartridge receiver 406. In one embodiment, the shoulder 406 interferes with the fuel cartridge receiver 406 when the fuel cartridge 402 is inserted to the proper depth.

In one embodiment, the fuel cartridge receiver 406 comprises a surface 426 through which the fuel cartridge 402 is inserted. The surface 426 may interact with the shoulder 424 to align the cartridge interface 404 in the fuel cartridge receiver 406.

Beneficially, a fuel cartridge receiver 406 comprising a surface through which the fuel cartridge 402 is inserted allows the use of differing lengths of fuel cartridge 402 in the same fuel cartridge receiver 406. Since the shoulder 424 aligns the cartridge interface 404 in the fuel cartridge receiver 406 independent of the length of the fuel cartridge 402, fuel cartridges of varying lengths may be employed.

Figure 5:
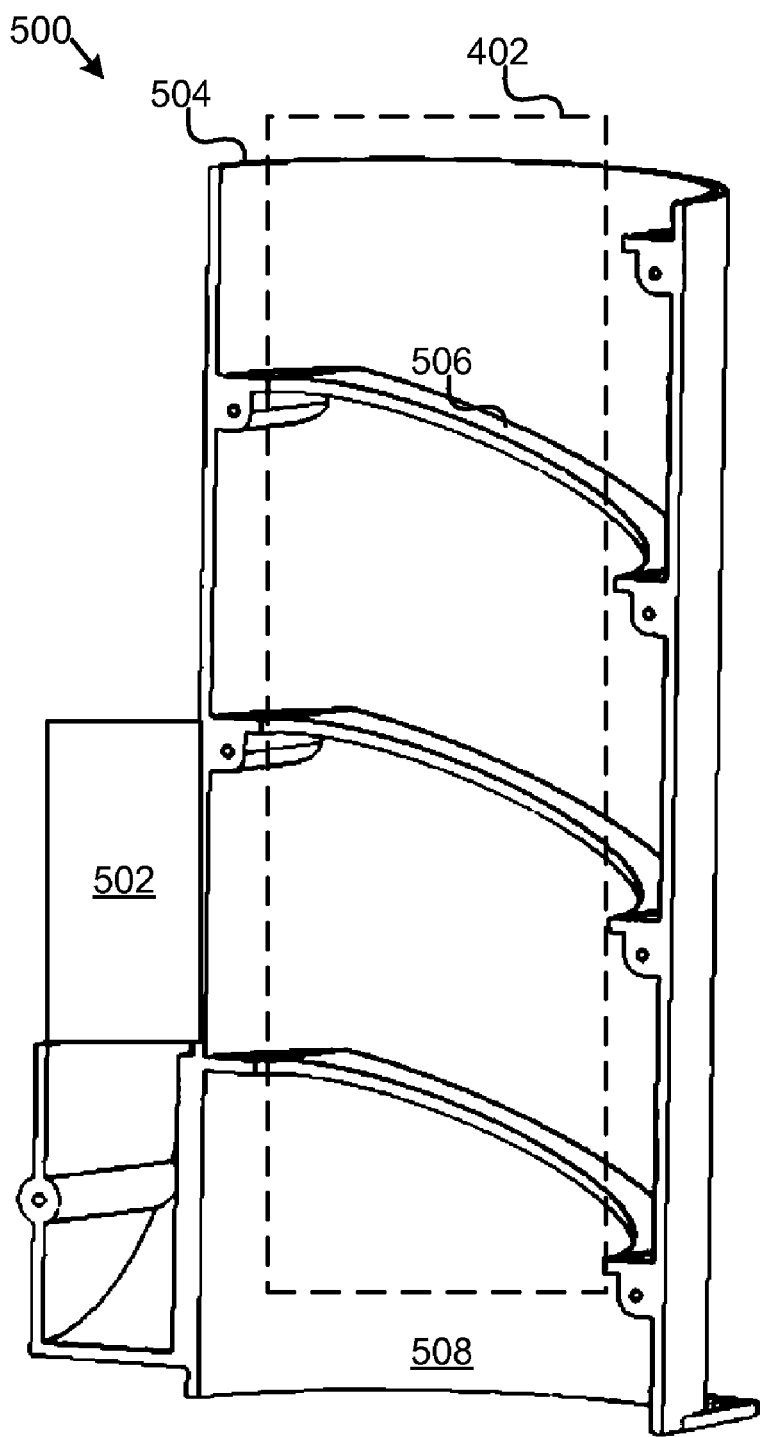
FIG. 5 is a schematic block diagram of one embodiment of a cooling system for a hydrogen generation system in accordance with the present invention.

FIG. 5 illustrates a schematic block diagram of one embodiment of a cooling system 500 in a hydrogen generation system according to the present invention. The cooling system 500 may be substantially similar to the cooling module 112 of FIG. 1. In one embodiment, the cooling system 500 may comprise a blower 502, a shroud 504, and one or more ribs 506. The cooling system 500 cools a fuel cartridge 402 in a hydrogen generation system.

The blower 502, in one embodiment, blows air that travels through the other components of the cooling system 500. The air absorbs heat from the fuel cartridge 402 through conduction and carries the heat out of the hydrogen generation system. In an alternate embodiment, the blower 502 moves an alternative cooling fluid, such as water, through the hydrogen generation system.

The shroud 504, in one embodiment, contains the air blown by the blower 502 as the air passes across the surface of the fuel cartridge. In one embodiment, the shroud 504 is disposed within or below the fuel cartridge receiver 406 and substantially surrounds the fuel cartridge 402 upon insertion. The shroud 504 may be made from any material that directs a flow of air, but is preferably made from a light, rigid material, such as a plastic.

In one embodiment, the blower 502 blows air in near a bottom 508 of the shroud 502. In the depicted embodiment, air flows from the bottom of the fuel cartridge 402 to the top of the fuel cartridge as the air absorbs heat.

In one embodiment, the one or more ribs 506 channel the flow of air. In certain embodiments, the one or more ribs 506 comprise a single helical rib that causes the flow of air from the blower 502 to travel in a helical path around the fuel cartridge. Beneficially, such a helical path increases a dwell time that the air is in contact with the surface of the fuel cartridge. Those of skill in the art will recognize that the vertical spacing between ribs 506 is directly proportional to the dwell time. The closer the ribs 506 are spaced vertically, the tighter the helical curves and the higher the dwell time, so long as the blower speed is reduced to compensate for increased air speed due to a smaller helical air channel around the fuel cartridge 402. Alternatively, the ribs 506 may have other configurations which increase the dwell time of the cooling air.

The ribs 506, in one embodiment, induce turbulence in the flow of air from the blower 502. The ribs 506 may induce turbulence through any method known in the art, such as by being formed at an angle to a flow of air, by including ridges or undulations, by adding protrusions separate from the ribs 506, or in a like manner. Those of skill in the art will recognize that turbulence induced in the flow of air from the blower improves the transfer of heat from the fuel cartridge 402 to the flow of air.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to generate hydrogen, the apparatus comprising:
   a liquid permeable material comprising one or more cavities, each cavity configured to at least partially enclose a solid anhydrous chemical hydride and an anhydrous activating agent, each cavity comprising liquid permeable material configured to permit passage of a liquid from one side of the liquid permeable material to the other side;
   a housing comprising a heat and pressure resistant material, the housing configured to receive the liquid permeable material, and a liquid;
   one or more liquid sources configured to introduce the liquid into the housing such that the liquid contacts at least a portion of the liquid permeable material; and
   a gas outlet port configured to release hydrogen gas produced by a reaction comprising the solid anhydrous chemical hydride, the anhydrous activating agent, and the liquid.

2. The apparatus of claim 1, further comprising a hydrogen output regulator configured to control the amount of hydrogen gas that the gas outlet port releases, wherein the hydrogen output regulator comprises a check valve that allows the hydrogen gas to exit the gas outlet port, but substantially prevents the hydrogen gas from entering the gas outlet port.

3. The apparatus of claim 2, wherein the hydrogen output regulator is further configured to regulate a gas pressure of the hydrogen gas that the gas outlet port releases such that the gas pressure remains at or below a predetermined gas pressure.

4. The apparatus of claim 2, wherein the one or more liquid sources comprise a liquid reservoir and one or more pumps, each of the one or more pumps configured to pump liquid from the liquid reservoir into the housing at a liquid injection rate.

5. The apparatus of claim 4, wherein the hydrogen output regulator comprises a controller configured to manage the liquid injection rate.

6. The apparatus of claim 5, wherein the controller determines the liquid injection rate based on one or more input signals.

7. The apparatus of claim 1, further comprising a liner disposed between the housing and the liquid permeable material, the liner configured to protect the housing from corrosion and damage.

8. The apparatus of claim 1, wherein the housing further comprises a crimp substantially circumscribing an end cap seated within a housing opening, the crimp configured to release the hydrogen gas in response to a gas pressure above a predetermined gas pressure.

9. The apparatus of claim 1, wherein the housing further comprises an activated charcoal filter configured to absorb impurities from hydrogen gas exiting the housing.

10. The apparatus of claim 1, further comprising one or more housing alignment features configured to ensure that the housing is disposed in a predetermined position and alignment relative to one or more receiving alignment features of an apparatus receiver.

11. The apparatus of claim 10, wherein the one or more housing alignment features comprise a handle.

12. The apparatus of claim 10, wherein the one or more housing alignment features engage the gas outlet port.

13. The apparatus of claim 1, wherein the liquid comprises water.

14. The apparatus of claim 1, wherein the cavities comprise one or more tubular pouches in a side-by-side configuration.

15. The apparatus of claim 14, wherein the housing is cylindrical and wherein the one or more tubular pouches are rolled such that a longitudinal axis of the rolled one or more tubular pouches is oriented coaxial with a longitudinal axis of the housing.

16. The apparatus of claim 15, wherein the housing is configured to receive a plurality of tubular pouches having a plurality of lengths, the plurality of tubular pouches stacked and arranged in alternating courses such that a course gap between two stacked tubular patches does not line up with a course gap in an adjacent course of liquid permeable pouches.

17. The apparatus of claim 1, wherein the liquid sources further comprise one or more liquid conduits disposed within the housing.

18. The apparatus of claim 1, further comprising an O-ring substantially circumscribing the gas outlet port to produce a seal between the gas outlet port and a receiver gas port, the O-ring configured to break the seal and release the hydrogen gas in response to a gas pressure above a predetermined gas pressure.

19. An apparatus to generate hydrogen, the apparatus comprising:

a water reservoir comprising liquid water;

one or more pumps in fluid communication with the water reservoir, the pumps configured to pump the liquid water at a liquid injection rate;

a water permeable pouch comprising one or more cavities, each cavity configured to at least partially enclose a solid anhydrous chemical hydride and an anhydrous activating agent, each cavity comprising liquid permeable material configured to permit passage of a liquid from one side of the liquid permeable material to the other side, the anhydrous activating agent comprising a salt having a metal selected from the group consisting of alkaline earth metals and alkali metals;

a fuel cartridge comprising a heat and pressure resistant material, the fuel cartridge configured to receive the water permeable pouch and the liquid water;

an end cap seated within an opening in the fuel cartridge, the end cap comprising one or more water injection tubes and a gas outlet port, the one or more water injection tubes in fluid communication with the one or more pumps, the one or more water injection tubes configured to introduce the liquid water into the fuel cartridge at the liquid injection rate such that the liquid water contacts at least a portion of the water permeable pouch, and the gas outlet port configured to release hydrogen gas produced by a reaction comprising the solid anhydrous chemical hydride, the anhydrous activating agent, and the liquid water;

a hydrogen output regulator configured to control the amount of hydrogen gas that the gas outlet port releases; and one or more fuel cartridge alignment features configured to ensure that the fuel cartridge is disposed in a predetermined position and alignment relative to one or more receiving alignment features of a cartridge receiver.

* * * * *